United States Patent [19]
Murphy et al.

[11] Patent Number: 5,077,677
[45] Date of Patent: Dec. 31, 1991

[54] PROBABILISTIC INFERENCE GATE

[75] Inventors: John H. Murphy; Terry A. Jeeves, Penn Hills; Arthur A. Anderson, Turtle Creek, all of Pa.

[73] Assignee: Westinghouse Electric Corp., Pittsburgh, Pa.

[21] Appl. No.: 364,475

[22] Filed: Jun. 12, 1989

[51] Int. Cl.$^5$ .............................................. G06F 15/18
[52] U.S. Cl. ..................................... 395/10; 364/736; 395/50; 395/51; 395/61; 395/3; 395/900
[58] Field of Search ............... 364/513, 736, 754, 768, 364/808, 841

[56] References Cited

U.S. PATENT DOCUMENTS

| | | | |
|---|---|---|---|
| 3,259,735 | 7/1966 | Senstad | 364/808 |
| 3,757,261 | 9/1973 | Sather | 364/736 |
| 3,803,390 | 4/1974 | Schaepman | 364/754 |
| 4,593,367 | 6/1986 | Slack et al. | 364/513 |
| 4,594,678 | 6/1986 | Unlenhoff | 364/736 |
| 4,599,692 | 7/1986 | Tan et al. | 364/513 |
| 4,611,305 | 9/1986 | Iwase | 364/736 |
| 4,620,188 | 10/1986 | Sengchanh . | |
| 4,620,286 | 10/1986 | Smith et al. | 364/513 |
| 4,641,356 | 2/1987 | Sternberg . | |
| 4,694,418 | 9/1987 | Ueno et al. . | |
| 4,875,184 | 10/1989 | Yamakawa | 364/807 |
| 4,945,506 | 7/1990 | Baji et al. | 364/736 |

OTHER PUBLICATIONS

A Probabilistic Causal Model for Diagnostic Problem Solving—Part I: Integrating Symbolic Causal Inference with Numeric Probabilistic Inference; Peng et al., IEEE Trans. on Systems, Man, and Cybernetics; vol. SMC-17, No. 2; Mar./Apr. 1987; pp. 146-162.
J. R. Quinlan (1987) "Inductive Knowledge Acquisition: a Case Study" in Applications of Expert Systems J. R. Quinlan, ed. pp. 157-173. Addison-Wesley, NY.
C. Johnson (1988) "In Search of the Silicon Brain" in Electrical Engineering Times Jun. 3, pp. 65.
Journal of the Association for Computing Machinery, "'Direct Search' solution of Numerical and Statistical Problems" vol. 2, pp. 212-229.
Richard O. Duda, Peter E. Hart and Nils J. Nillson, "Subjective Bayesian methods for Rule-Based Inference Systems", vol. 2, pp. 192-199, 212-229.
(List continued on next page.)

Primary Examiner—Allen R. MacDonald
Attorney, Agent, or Firm—W. G. Sutcliff

[57] ABSTRACT

The present system performs linear transformations on input probabilities and produces outputs which indicate the likelihood of one or more events. The transformation performed is a product of linear transforms such as $P_o = [A_j P_j + B_j] \cdot [A_k P_k + B_k]$ where $P_j$ and $P_k$ are input probabilities, $P_o$ is an output event probability and $A_j$, $B_j$, $A_k$ and $B_k$ are transformation constants. The system includes a basic processing unit or computational unit which performs a probabilistic gate operation to convert two input probability signals into one output probability signal where the output probability is equal to the product of linear transformations of the input probabilities. By appropriate selection of transformation constants logical and probabilistic gates performing the functions of AND, NAND, OR, NOR, XOR, NOT, IMPLIES and NOT IMPLIES can be created. The basic unit can include three multipliers and two adders if a discrete component hardwired version is needed for speed or a single multiplier/adder, associated storage and multiplex circuits can be used to accomplish the functions of the hardwired version for economy. This basic unit can also be provided as a software implementation, can be implemented as a hardwired decision tree element implementation or implemented as a universal probabilistic processor and provided with a bus communication structure to create expert systems or neural networks suitable for specific tasks. The basic units can be combined to produce a virtual basic building block which has more virtual processors than physical processors to improve processor utilization. The building blocks can be combined into an array to produce either a high speed expert system or a high speed neural network.

28 Claims, 21 Drawing Sheets

OTHER PUBLICATIONS

Dennis V. Lindley, *Statistical Science,* 1987, vol. 2, No. I, 3-44 "The Probability Approach to the Treatment of Uncertainty in Artificial Intelligence and Expert Systems" pp. 17-24.

Implementing Neural Nets with Programmable Logic; J. J. Vidal; IEEE Transactions on Acoustics, Speech, and Signal Processing; vol. 36, No. 7, Jul. 1987; pp. 1180-1190.

Modern Dictionary of Electronics; Rudolf F. Graf; Howard W. Sams & Co., Inc; 1977, p. 473.

An Introduction to Computing with Neural Nets; IEEE ASSP Magazine Apr. 1987; Lippmann; pp. 4-21.

K. Fukushima, S. Miyake and T. Ito, "Neocognitron: a Neural Network Model for a Mechanism of Visual Pattern Recognition" *IEEE Transactions on Systems, Man, and Cybernetics* SMC-13:826-834.

Robert Hecht-Nielsen, Komogorov's Mapping Neural Network Existence Theorem, pp. 11-13.

W. S. McCulloch & W. H. Pitts, A Logical Calculus of the Ideas Immanent in Nervous Activity, pp. 19-39.

E. A. Feigenbaum, The Art of Artificial Intelligence, pp. 1014-1029.

Robert Hecht-Nielsen, Neurocomputing: picking the human brain, IEEE Spectrum, Mar. 1988, pp. 36, 41.

D. E. Rumelhart, G. E. Hinton & R. J. Williams, Learning Internal Representations by Error Propagation, pp. 319-362.

Robert Hecht-Nielsen, Neurocomputer Applications, pp. 445-453.

J. R. Ball, R. C. Bollinger, T. A. Jeeves, R. C. McReynolds, D. H. Shaffer, On the Use of the Solomon Parallel-Processing Computer, pp. 137-146.

"The Acquistion Problem is the Most Critical 'Bottleneck' Problem" E. A. Feigenbaum (1981) Expert Systems in the 1980s in State of the art report on machine intelligence A. Bond, ed. Pergamon-Infotech, Maindenhead.

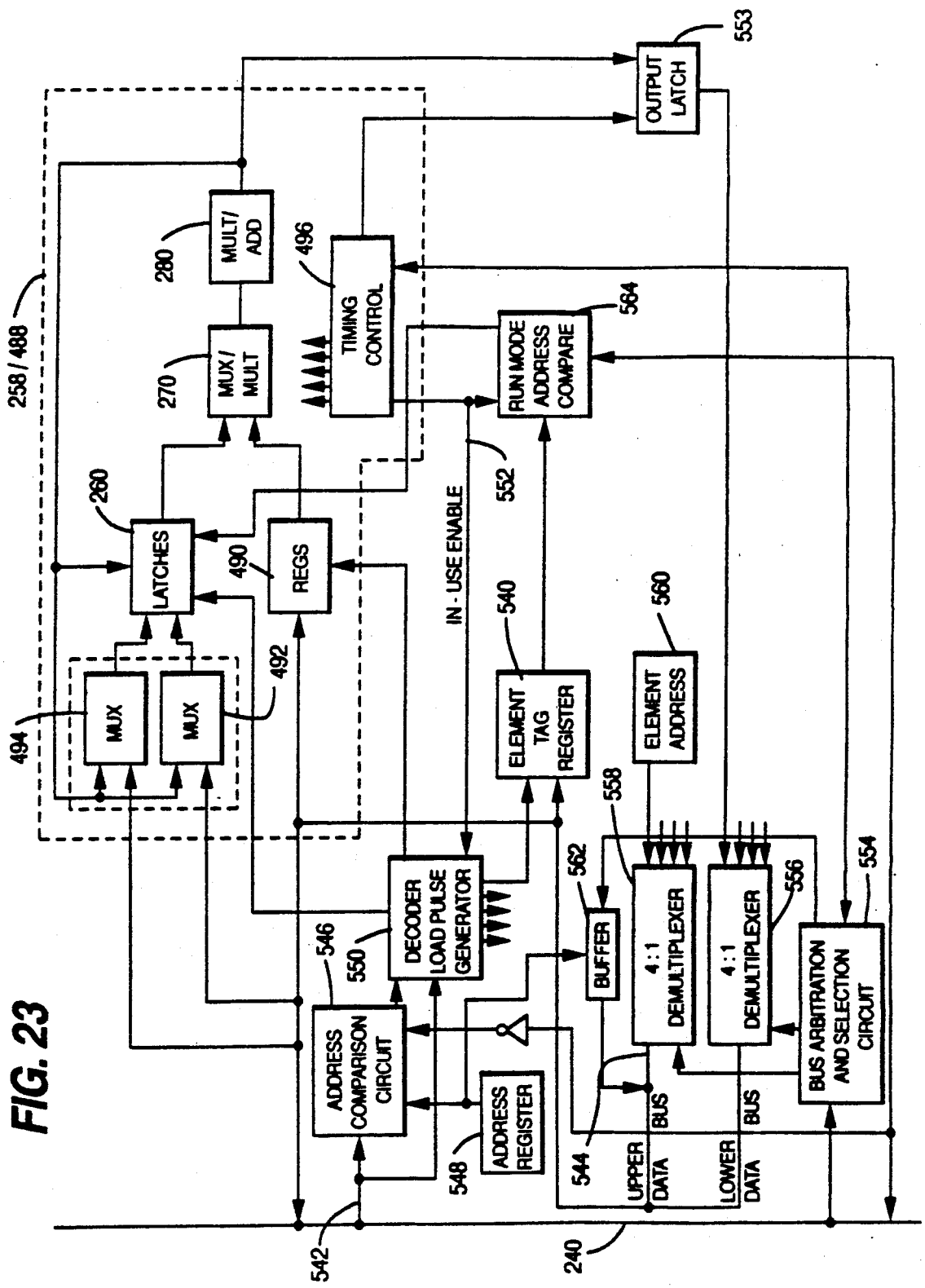

PROBABILISTIC INFERENCE GATE

BACKGROUND OF THE INVENTION

1. Field of the Invention

The present invention is directed to a probabilistic reasoning expert system and, more particularly, to a software and hardware implementation of an expert system which bases conclusions on the mathematics of deductive and inductive reasoning using probability measures.

2. Description of the Related Art

Expert systems badly need a calculus for uncertainty propagation based on sound mathematical principles. Without a solid foundation for reasoning with uncertainty, there is little hope for using expert system technology to autonomously perform critical decision-making in military and commercial systems.

Advances based on computer system technology have made machinery able to perform nearly every task imaginable. Computer hardware technology has advanced to the point where computational speed and memory storage requirements no longer restrict the development of intelligent machinery. Computer software technology has superficially explored several facets of programming synthetic intelligence but has failed to advance far enough to spark the emergence of the era of intelligent machinery.

While computer use has become quite pervasive in the past few years, clear limitations on its applicability have appeared. For example, computers have had but limited success in the areas of image processing and process control. In an attempt to extend the usefulness of computers, the academic discipline of Artificial Intelligence (AI) has resorted to the construction of expert systems based on ad hoc rules. Extensive and exhaustive efforts have succeeded in producing a variety of tour de force systems. Using the fastest supercomputers (or else specialized hardware devices), AI systems have succeeded in playing chess at levels approaching that of master chess players. However, expert systems have not reached the level of sophistication and reliability necessary to carry out missions like sweeping for mines and controlling fighter airplanes. Nor have such systems been applied to control a manufacturing process. The most touted examples of expert systems have been in areas of medical diagnosis (MYCIN). Yet even there, use has been relegated to the role of a sometime consultant and no one would consider relying on them for a definitive diagnosis. Expert systems have had some successes in prospecting for minerals (PROSPECTOR), shipping computer system components (XCON or R1), and diagnosing faults in oil processing equipment (AL/X), but generally they are not sufficiently successful to entrust them with essential or vital functions. The lack of trust associated with the ad hoc expert systems results primarily from the fact that these systems can neither be validated nor verified. As a result, a natural barrier arises to using such software in military or human safety critical applications.

SUMMARY OF THE INVENTION

It is an object of the present invention to provide an expert system that performs reasoning based on probability.

It is another object of the present invention to provide an expert system that is verifiable and validatable.

It is a further object of the present invention to provide an expert system that can be implemented in either hardware or software.

The above objects can be accomplished by a system that performs linear transformations on input probabilities and produces outputs which indicate the likelihood of one or more events. The system includes a basic processing unit or computational unit which performs a probabilistic logic operation to convert input probability signals into output probability signals where the output probability is equal to the product of linear transformations of the input probabilities. This basic unit can be implemented in software and provided as the core of a software implementation, it can be implemented in hardware and replicated to create a hardwired decision tree or replicated in hardware and provided with a bus communication structure to create a flexible hardware expert system.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 23 depicts routing control circuitry used in each processing element in an array;

DESCRIPTION OF THE PREFERRED EMBODIMENTS

Figure 1:
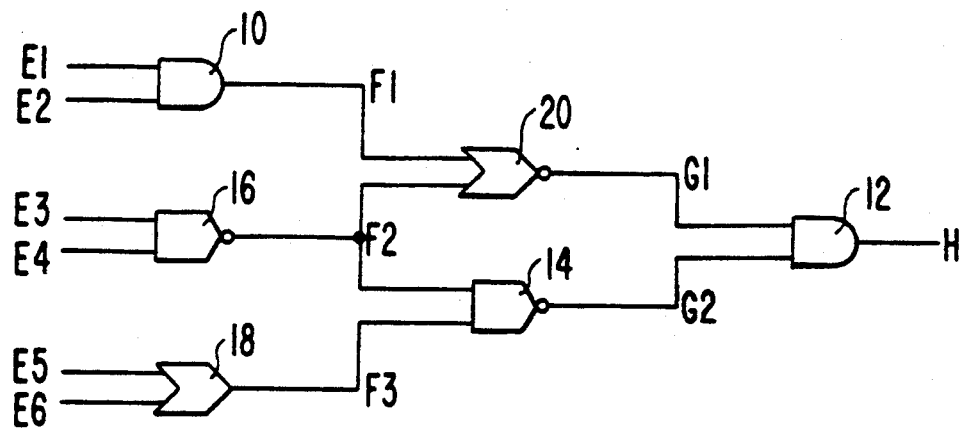
FIG. 1 depicts a typical expert system decision tree using universal probabilistic gates according to the present invention.

There are now three types of expert systems. These systems are based on three types of "logic" which are called ad hoc, semi-rigorous, and consistent. These systems meet different practical needs and find application in distinct fields at substantially different levels of logical rigor. Typical examples of these fields are medicine, mining and adaptive controls, respectively. The first two systems are typified by the MYCIN and PROSPECTOR systems previously mentioned. They are state-of-the-art expert systems. The third system is the probabilistic reasoning system of the present invention. The development of the present invention was motivated by the need to realize real-time control systems, a task for which the other types of expert systems are unsuited. Prior expert systems lacked a calculus for uncertainty propagation which was based, not on arbitrary ad hoc propositions, but on sound mathematical principles. Because the usual ad hoc reasoning is not used, the present invention is a major departure from the artificial intelligence principles which underlie the prior art systems.

A central problem in constructing an expert system is the number of possible interrelationships among inputs. This number grows exponentially with the number of inputs. To reduce this complexity, prior art expert systems resort to strong and unrealistic assumptions about the independence of the rule components. The present invention has avoided the need for such assumptions Central to the development of the present invention is the creation of a new concept to measure the degree of independence called the I-factor (Independence factor). In the present invention complexity grows only linearly with the number of inputs.

The present invention is based on linear transformations and can be realized in software using a universal formula. The present invention can also be realized in hardware using a universal probabilistic logic gate which performs the function of the formula. This gate can be functionally composed of three probabilistic IMPLIES gates. Each of these gates implements a linear transformation. The universal probabilistic gate can also be accomplished as the product of the outputs from two linear transformations. This last design utilizes less silicon in its implementation and is the preferred implementation for this reason.

The first attempts to use computers to solve nonnumeric problems focused on developing algorithms that would enable a computer to mimic a human performing a specific limited task, for example, to play a reasonable game of chess or checkers against a human opponent. Those familiar games have no hidden information and consequently they have well determined outcomes. However, because of the large number of alternative ways to play these games, specific sequences of plays which can be followed to attain the best outcome are not known. In fact, despite the outcome being well determined, its actual value is not known. The speed and capacity of electronic digital computers are not sufficient to explore all the possible alternative ways to play in any feasible time. What has proven feasible is to combine a large volume of purely mechanistic work (such as, examine all alternatives for a few moves ahead) with a limited number of simple rules (such as, control the center). The resulting algorithms appear to play a respectable (but not perfect) game of chess. The outcome of this work was the idea of developing a set of rules to define an expert system for performing a specific task. This idea has since been applied to other nonnumeric problems.

Several efforts have been made to extend the expert system paradigm into medical fields, in particular, to the problem of diagnosis. Here, the major time-consuming task was identifying the rules used to determine the diagnosis. This task proved to be long and tedious. Nevertheless, in due time, a successful demonstration was crafted and the resulting MYCIN program proved to have a diagnostic performance comparable to that of the typical internist. The idea that one could build a useful expert system was demonstrated. The MYCIN program consisted of two major functional parts, a knowledge base containing detailed information about the field of interest, and a general inference engine capable of extracting sensible advice from that knowledge base.

The inference engines of these ad hoc systems were constructed to work with some criterion which indicated the degree of assurance in the advice, a measure of belief. Measures of belief were associated with both the supplied data and the items of information extracted from the knowledge base. Then, to actually construct an inference, these individual measures of belief had to be combined in both sequential and parallel ways. Originally, strictly ad hoc methods were used to carry out the composition. These methods were plagued by both complexities and inconsistencies. Subsequently, to remove the inconsistencies, the original MYCIN certainty factor was modified. To reduce the complexity, strong assumptions about independence were added.

The MYCIN program was promoted as the forerunner of a class of medical-advisor programs. The thought was that the inference engine could be used as a universal paradigm and then, in order to apply it to each individual field, one merely needs to distill the experience of bonafide experts into a set of rules stored in a special computer-accessible database (the knowledge base). It was assumed further that, as experience was gained, this set of rules could be continuously refined and expanded to yield ever more powerful and useful systems: This concept, involving a conjunction of inference engine and knowledge base, was carried over into industry A few such expert systems were designed and put into successful operation.

There are many flaws in the paradigm. Nevertheless, the advocates of this approach considered the constructed expert systems to be useful as suggesters of actions to be considered, if not as a control device to select and carry out those actions. That is, the ad hoc expert system was conceived as a system whose output was to be, at all times, screened by a perceptive and competent human mind. The use of ad hoc rules resulted in the system being subject to inconsistencies and erratic performance. However, it was felt that progressive refinement of the rules would, in time, exorcise these inconsistencies. This general attitude in favor of an ad hoc approach, unfortunately made its advocates insensitive to the essential inconsistencies built into the original MYCIN inference engine. Improved inference engines are now available.

The semi-rigorous logic system is a branch off from that of purely ad hoc logic systems. In this branch, a serious attempt was made to incorporate probability, at least to some degree, into the structure of the inference engine. The idea was to anchor the expert system to the known and powerful methods of classical mathematics. The exemplar of this approach is the well-known PROSPECTOR system. It starts with classical probability but stumbles over complexities arising out of the model. These complexities are in part real and in part a feature of the approach chosen. The nature of the perceived problem can be seen from the following example. Consider a system with n-distinct binary inputs, there are then $2^n$ distinct cases and $2^n$ distinct probabilities to determine. If a frontal approach were chosen for the estimation of these probabilities, then one would require the collection of an enormous amount of data. An undertaking that is utterly infeasible for even modest values of n. Of course, in practice, most of these probabilities are irrelevant, a situation familiar to statisticians. The PROSPECTOR program was based on a different approach. Despite its known inapplicability, the strong assumption of conditional independence was again used, the same compromise that was used by MYCIN to eliminate complexities. Then, in an attempt to ameliorate the effects of this assumption, some ad hoc variations were introduced. The result was a system of uncertain validity, another flawed paradigm. Nevertheless, the advocates of this approach considered the constructed expert system to be useful as a suggester of actions to be considered, if not as a control device to select and carry out those actions. They considered it to be a system whose output was superior to that of the original MYCIN-type ad hoc logic system, but it was still a system which required screening by a perceptive and competent human mind. As its name suggests, this system proved useful in prospecting for natural resources.

The present invention, a consistent logic system, goes beyond that of being an advisor and is capable of functioning as an intelligent adaptive controller. Neither of the prior art systems is suitable for use as an adaptive control system. For that one needs to have a system which is logically consistent and does not need to be closely supervised by a perceptive human mind. The probabilistic reasoning expert system has been developed to be just such a logically consistent system, a system whose performance can be verified and validated in advance of its use. The core of the system is the I-factor. This factor provides an explicit and precise measure of independence as discussed below.

Probabilities take on values between zero and one. The probability of the empty set is zero and the probability of the universe is one. Probabilities are defined on sets in a specified universe. The simplest model for probabilities is that of an urn filled with a finite number of balls. Then for any set of balls, the probability measure of that set is simply the number of balls in the set divided by the total number of balls in the urn. When the universe has more than a finite number of balls, the definition of probability is given in terms of measurable functions, the operation of summing is replaced by the operation of integration.

Computations with probabilities obey a few very simple rules. Discussed below are the rules for addition and for multiplication. For two sets A and B, the measure of their union, $P\{A+B\}$, is equal to $P\{A\}+P\{B\}-P\{AB\}$ where AB denotes the intersection of the two sets. That is, we add the number of balls in A to the number of balls in B and subtract the number of balls which have been counted twice. The formula for addition is:

$$P\{A+B\} = P\{A\} + P\{B\} - P\{AB\} \qquad (1)$$

If there are no balls in both sets then the sets are mutually exclusive, and the formula reduces to $P\{A+B\}=P\{A\}+P\{B\}$. The universe can always be divided up into mutually exclusive sets. For two sets A and B, the measure of their intersection, written $P\{AB\}$, is equal to the number of elements in both sets divided by the number of elements in the universe, that is, $n(AB)/n(\Omega)$. This can be rewritten as the product of two factors $n(AB)/n(B)$ and $n(B)/n(\Omega)$. The second of these factors is simply $P\{B\}$. To see the meaning associated with the first factor, we consider a new universe obtained by putting all the balls of the set B into a new urn. Then, the first factor is simply the probability of A in this new universe. This probability is termed the "probability of A given B," or the probabilistic inference of A given B and is written $P\{A|B\}$. The formula for multiplication is:

$$P\{AB\} = P\{A|B\}P\{B\} \qquad (2)$$

In an exactly similar way, we obtain the formula for multiplication in terms of the probability of B given A, namely, $P\{AB\}=P\{B|A\}P\{A\}$.

Consider the two ratios defined above. If the ratio $n(AB)/n(B)$ is equal to $n(A)/n(\Omega)$, then the probability of A is the same in both the original universe, $\Omega$, and the restricted universe, B. If this happens, we say that A is independent of B. When A and B are independent, we have a simpler formula for multiplication $P\{AB\}=P\{A\}P\{B\}$. In order to have a measure of the degree of independence between A and B, we look at the ratio of these two probabilities for A, namely $P\{A\}$ and $P\{A|B\}$. We define the I-factor as this ratio as set forth below in equation (3):

$$I(A,B) = \frac{P\{A|B\}}{P\{A\}} = \frac{P\{AB\}}{P\{A\}P\{B\}} \qquad (3)$$

If A and B are independent then $I(A,B)=1$. Note that $I(A,B)=I(B,A)$, so that the I-factor is symmetric in A and B. The I-factor is non-negative The I-factors were invented to make the application of probabilities to expert systems feasible. Their usefulness extends far beyond this initial field of application.

This formalism is useful to not only expert system formulation but also to neural network construction. Using the I-factor we can write the formulas for addition and multiplication in the forms:

$$P\{AB\} = I(A,B) \, P\{A\} \, P\{B\} \quad (4)$$

$$P\{A+B\} = P\{A\} + P\{B\} - I(A,B) \, P\{A\}P\{B\} \quad (5)$$

The above formula for the I-factor is in terms of absolute probabilities. It is also valid for conditional probabilities as set forth in equation (6) below:

$$I(A,B|C) = \frac{P\{AB|C\}}{P\{A|C\}P\{B|C\}} \quad (6)$$

Of course, this is only a proper formula if the conditional probabilities exist, in particular, if the set C is not empty.

The number of I-factors in a system is proportional to the number of processing elements, the number does not grow exponentially and consequently I-factors are amenable to estimation by conventional statistical techniques. The use of this factor enables the present invention both to avoid complexities in the implementation and to retain a firm foundation in a consistent mathematical theory, namely, probability theory. Using this factor, the present invention is able to implement an adaptive control system whose performance can be verified and validated. The measure of belief is true probability. The following formula for a linear transformation, developed using the I-factor, can be represented as a processing element, or step and is at the heart of probabilistic reasoning system of the present invention.

$$Y = AX + B \quad (7)$$

This single linear transformation realizes a probabilistic implication or IMPLIES element or universal implication element. In this equation, the quantity X is the input signal, the quantity Y is the output signal, the quantity A is a composite expression containing two I-factors, and the quantity B is a composite expression containing one I-factor. In the expression of equation (7), the input signal is $P(E|E')$, the probability of the event E given the event E'. The output signal is $P(H|E')$, the probability of the event H given the element E'. The relationship between them is given by probability theory as:

$$P(H|E') = P(H|\overline{EE'}) \cdot P(\overline{E}|E') + P(H|EE') \cdot P(E|E') \quad (8)$$

The first factor in each of the two terms on the right side is superceded by the product of two factors one of which is the I-factor Specifically, $$P(H|EE') = I(HE'|E) \cdot P(H|E) \quad (9)$$

and $$P(H|\overline{E}E') = I(HE'|\overline{E}) \cdot P(H|\overline{E}) \quad (10)$$

The second expression (10) is B and the first expression (9) is A−B. Since $P(\overline{E}|E')$ is equal to $1-P(E|E')$, the expression for $P(H|E')$ becomes:

$$P(H|E') = A \cdot P(E|E') + B \quad (11)$$

or equation (7). Two IMPLIES elements can be combined together to realize a probabilistic gate. This gate is essentially a combination of three such linear transformations. The probabilistic gate is a universal processing element for constructing expert systems.

When actually constructing the physical device, some economy of silicon can be realized by specifying a minimal design which realizes the probabilistic gate or probabilistic inference element as the simple product of two linear transformations as set forth in equation (12) below:

$$Z = (AU+B) \cdot (CV+D) \quad (12)$$

Alternatively, the probabilistic gate can be realized using three linear transformations as set forth in equation (13):

$$Z = (AU+B) \cdot (CV+D) + E \quad (13)$$

The rules of the expert system are realized by assigning appropriate values to the parameters A,B,C,D and E and the details of this assignment process will be discussed later. The inputs and output preferred in the present invention are numbers from 0.0 to 1.0 inclusive which represent probabilities. For example, an output could be Z=0.2 or a probability of 20%. By appropriate prescaling and post scaling of the inputs and output, any number range values including positive and negative values can be input and output. For example, 20.0 as an unscaled input value can be translated into a scaled value of 0.2 by dividing by 100 prior to input. The preferred values can also be transformed into odds likelihood form such as 0.2 equals 1 to 5. By performing a monotonic translation, the probability used by the present invention can also be transformed into a certainty factor by a statistical mathematician of ordinary skill.

There are two advantages in realizing the probabilistic gate with three linear transformations as in equation (13). First, there is only one basic device so that the total design is simpler and hence easier to check out. Second, all the simple logical functions can be available using less silicon because latches can be substituted for registers in the chip. These silicon savings can be significant if the expert system has a high proportion of logical functions. When the probabilistic gate is used as the building block element of a neural network, the three linear transformation form is to be preferred because of its greater flexibility and because the resulting network is more uniform and has a simpler structure.

Expert systems, according to the present invention, represent a class of problems which can be formulated in terms of the propagation of integers through a network, where the state of each node in the network is depicted by a set of integers and the integer values at each node depend upon operations performed on the states of adjacent nodes. Expert systems accept a number of input signals, process them through stages, and finally present one or more output signals. Typically, the processing stages have the same structure as a decision tree, as illustrated in FIG. 1, where gates 10 and 12 represent probabilistic AND gates, gates 14 and 16 represent probabilistic NAND gates, gate 18 represents a probabilistic OR gate and gate 20 represents a probabilistic NOR gate. In FIG. 1, Ei represents the evidence supporting the hypothesis H, and Fj and Gk represent intermediate results. Each of these gates or probabilistic operations can be represented using an equation such as equation (12) previously discussed, set forth in a more useful form in equation 14 below.

$$P_o = [A_j P_j + B_j] \cdot [A_k P_k \cdot B_k] \quad (14)$$

where $P_o = P(H | E_j' E_k')$ (15)

$$P_j = P(E_j | E_j') \quad (16)$$

$$P_k = P(E_k | E_k') \quad (17)$$

where $P_o$ is the probability of the hypothesis H, given the two observed events $E_j'$ and $E_k'$, $P_j$ is the probability of the intermediate event $E_j$ given the observed event $E_j'$ and $P_k$ is the probability of the intermediate event $E_k$ given the observed event $E_k'$. The quantities $A_j$, $B_j$, $A_k$ and $B_k$ involve only the probabilities of the hypothesis H given the intermediate events $E_j$, $E_k$, $E_j'$ and $E_k'$ and the I-factor measures of degree of independence. $P_o$ can be expressed as the product of three factors:

$$P_o = \frac{P(H|E_j' E_k')}{P(H|E_j') \cdot P(H|E_k')} \cdot P(H|E_j') \cdot P(H|E_k') \quad (18)$$

where the second and third factors are the probabilistic IMPLIES of equation (7) previously discussed. As a result, $$P(H|E_j') = a_j P_j + b_j \quad (19)$$

and $$P(H|E_k') = a_k \cdot P_k + b_k \quad (20)$$

where $$a_j = I(HE_j' | E_j) \cdot P(H|E_j) - b_j \quad (21)$$

$$b_j = I(\overline{H}E_j' | E_j) \cdot \overline{P}(H|E_j) \quad (22)$$

$$a_k = I(HE_k' | E_k) \cdot P(H|E_k) - b_k \quad (23)$$

$$b_k = I(\overline{H}E_k' | E_k) \cdot \overline{P}(H|E_k) \quad (24)$$

where the expressions for $a_j$, $b_j$, $a_k$ and $b_k$ are the ones given for the probabilistic IMPLIES previously discussed with respect to equation (7). The first factor in equation (22) can be expanded into the following form:

$$\frac{P(H|E_j' E_k')}{P(H|E_j') \cdot P(H|E_k')} = \frac{P(HE_j' E_k')}{P(E_j' E_k')} \cdot \frac{P(E_j')}{P(HE_j')} \cdot \frac{P(E_k')}{P(HE_k')} \cdot$$

$$\frac{P(H)}{P(H)} = \frac{K(H, E_j' E_k')}{P(H)} \quad (25)$$

where the quantity $K(H, E_j', E_k')$ is called the K-factor and is symmetric in its three arguments. K is a measure of degree of mutual independence of the three events H, $E_j'$ and $E_k'$. The K-factor can be expressed in terms of the previously defined I-factor as:

$$K(H, E_j', E_k') = \frac{I(E_j' E_k' | H)}{I(E_j' E_k')} \quad (26)$$

To obtain the expressions for $A_j$, $B_j$, $A_k$ and $B_k$ we multiply the quantities $a_j$, $b_j$, $a_k$ and $b_k$ by the square root of the first factor:

$$A_j = \sqrt{\frac{K(H, E_j', E_k')}{P(H)}} \cdot I(HE_j'|E_j) \cdot P(H|E_j) - B_j \quad (27)$$

$$B_j = \sqrt{\frac{K(H, E_j', E_k')}{P(H)}} \cdot I(H\overline{E_j'}|E_j) \cdot P(H|\overline{E_j}) \quad (28)$$

$$A_k = \sqrt{\frac{K(H, E_k', E_j')}{P(H)}} \cdot I(H, E_k'|E_k) \cdot P(H|E_k) - B_k \quad (29)$$

$$B_k = \sqrt{\frac{K(H, E_k', E_j')}{P(H)}} \cdot I(HE_k'|\overline{E_k}) \cdot P(H|\overline{E_k}) \quad (30)$$

The square root of the first factor has been used to distribute the magnitude of the first factor between the two linear transformations. For any given application the magnitude can be distributed so as to limit the size of the intermediate calculations. As a result, two values $Q_j$ and $Q_k$ can be used whose product equals the first factor:

$$Q_j \cdot Q_k = \frac{K(H, E_j', E_k')}{P(H)} \quad (31)$$

$a_j$ and $b_j$ can be multiplied by $Q_j$ and $a_k$ and $b_k$ multiplied by $Q_k$ to give alternative values for $A_j$, $B_j$, $A_k$ and $B_k$ as follows:

$$A_j^* = Q_j a_j - B_j^* \quad (32)$$

$$B_j^* = Q_j b_j \quad (33)$$

$$A_k^* = Q_k a_k - B_k^* \quad (34)$$

$$B_k^* = Q_k b_k \quad (35)$$

Other mathematical methods are available for determining the values of the constants A and B. The choice discussed above minimizes the number of bits that must be stored, on average. Another choice could reduce the constants A and B to a single value with a larger number of bits.

Figure 2:
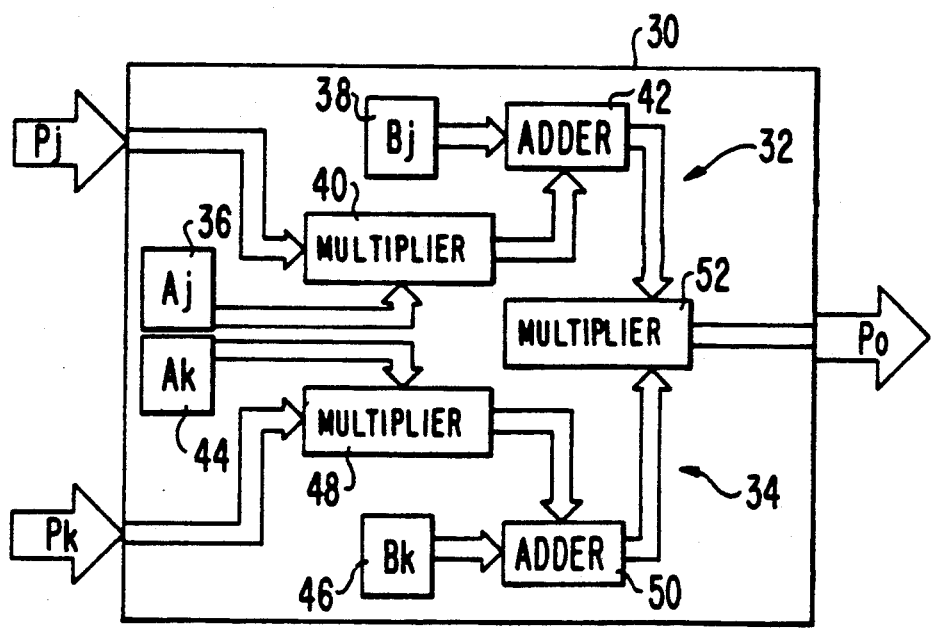
FIG. 2 illustrates a discrete component version of a universal probabilistic gate in accordance with the present invention.

The universal probabilistic gate equation (14) can be implemented as a hardwired conventional discreet component gate 30 as illustrated in FIG. 2. This gate 30 includes two implies elements 32 and 34 where, for example, the implies element includes constant registers 36 and 38, a multiplier 40 and an adder 42. These components are preferably integer components but could be floating point if desired. The outputs of the implies elements are combined by a combining element 52 which is a multiplier. This universal gate can be configured to perform each of the probabilistic gate functions depicted in FIG. 1 as well as logical gate functions by setting the constants to appropriate values as illustrated in FIG. 3.

Figure 3:
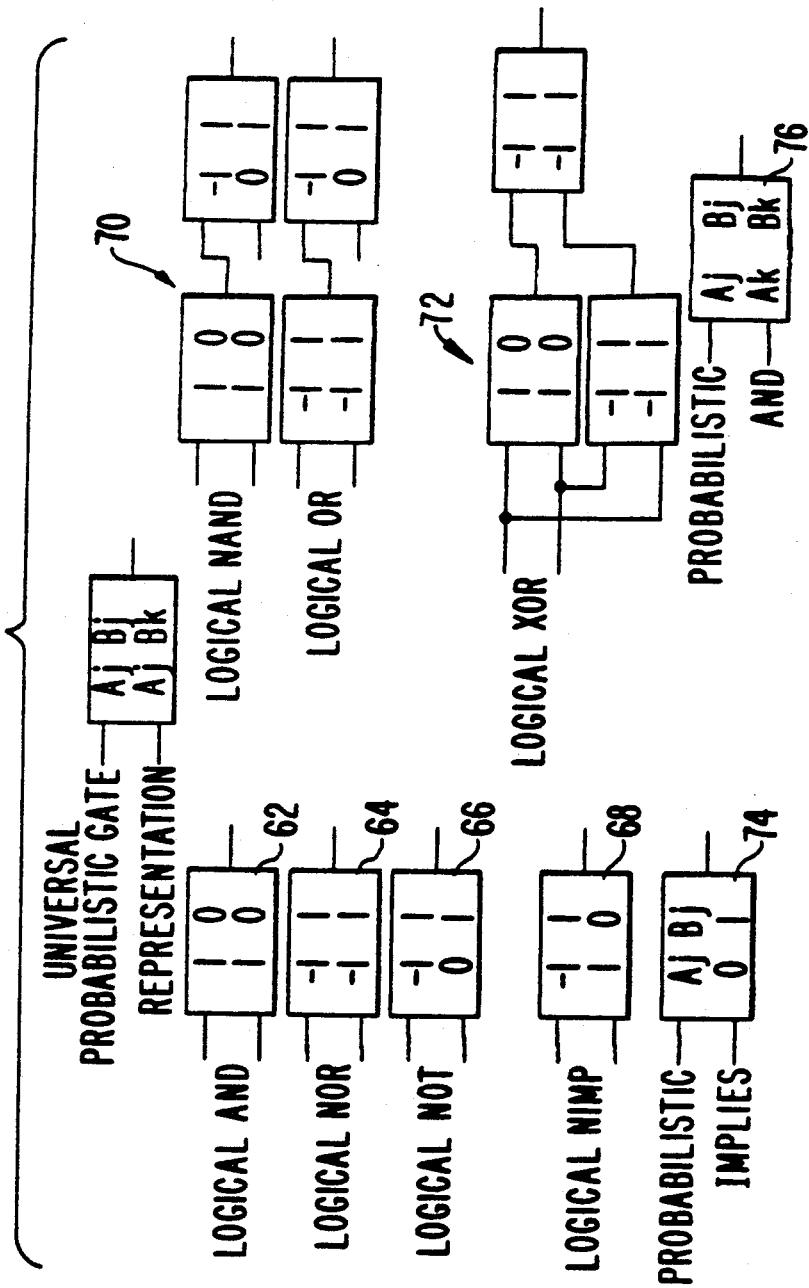
FIG. 3 depicts constant values which will convert the universal gate of FIG. 2 into a particular type of gate.

FIG. 3 depicts the constant values for the various logical operations and depicts the constant values for the probabilistic implies element 74 and the probabilistic AND gate 76. The remaining probabilistic gates, such as the NAND, OR, NOR, XOR and NOT can be produced in a similar fashion by substituting constants with values as illustrated in the corresponding logical gate representations. It is also possible to perform the probabilistic gate functions illustrated in FIG. 1 by compound execution of equation (14) for each one of the gates illustrated in FIG. 1.

Figure 4:
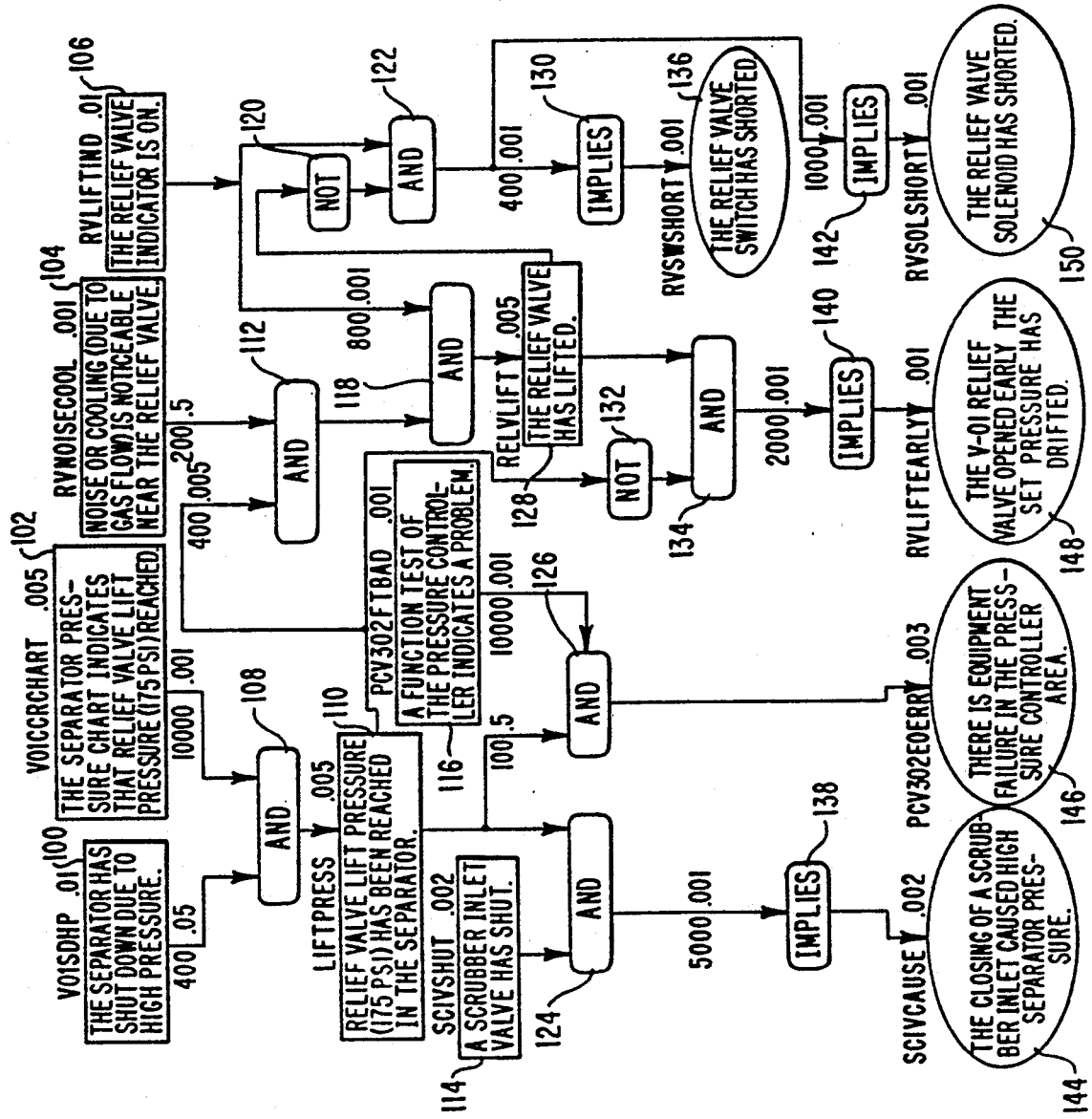
FIG. 4 is a decision tree of a portion of the AL/X network used by expert system designers to compare the operation of expert systems.

To illustrate how the present invention can be implemented in either hardware or software, an example of an eleven rule expert system which has been extensively analyzed in the literature and which is illustrated in FIG. 4 will be discussed in detail. For a review of the implementation of this network in an AL/X inference system shell the reader is referred to J. Reiter, AL/X: An Expert System Using Plausible Inference, Intelligent Terminals Ltd., Oxford (1980) and J. R. Quinlan; Inferno: A Cautious Approach to Uncertain Inference, The Computer Journal, Vol. 26, No. 3 (1983). FIG. 4 represents a small fragment of an expert system designed to diagnose problems on an oil drilling platform. An oil drilling platform is a complex system of pipes, pumps, vessels, measuring instruments, etc. which are constantly measured and monitored. The control system identifies potentially abnormal conditions and whenever such a problem is identified, automatic shutdown procedures are initiated to avoid potentially dangerous conditions. The immediate cause of the abnormal condition is known and the expert system is designed to identify the underlying cause of these conditions. In the specific part of the network represented herein, the abnormal condition causing the shutdown was high gas pressure. Intermediate causes, which can be identified, might be that a scrubber inlet valve has shut, the relief valve indicator is on, etc. Typical underlying causes which the system is designed to diagnose are that the relief valve has shorted, the solenoid of the relief valve has shorted, etc. The expert system would typically be exercised by an operator as an interactive computerized consultation. In the diagram of FIG. 4, the nodes represent evidence, intermediate inferences and conclusions, and the links are prescribed paths for reasoning from the evidence to the conclusions. FIG. 4 illustrates the flow diagram of this problem with the prior probabilities at major nodes (for example 0.01 at V01SDHP) rule strengths (in odds - likelihood ratio form) connecting pairs of nodes for example 400 and 0.05 for the link tying V01SDHP to lift press, and uniary and binary operators for node interconnections (for example, AND, IMPLIES and NOT).

Figure 5:
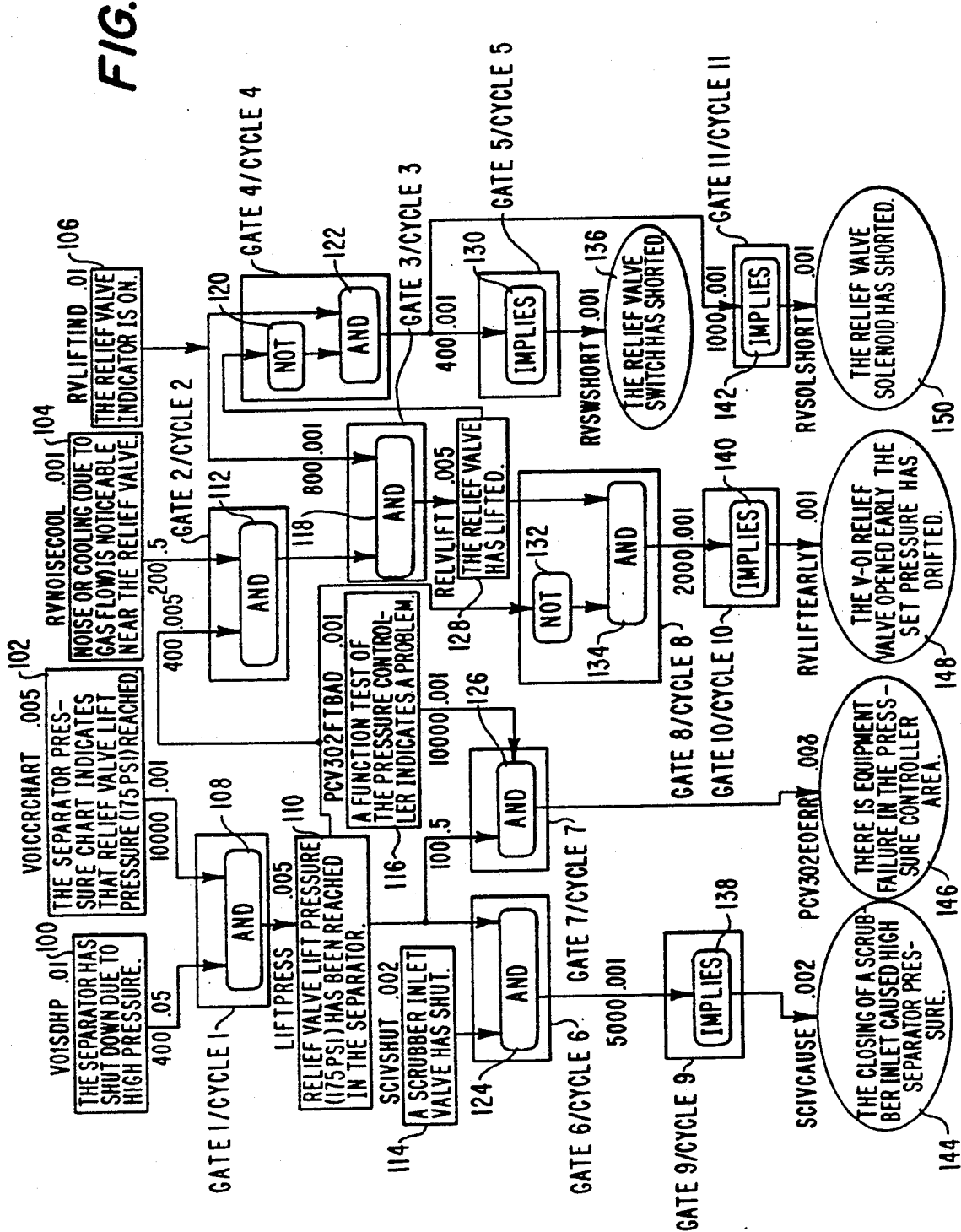
FIG. 5 illustrates how the present invention can be used to produce the inferences of the network illustrated in FIG. 4.

The first step in converting the decision tree illustrated in FIG. 4 into either a hardware or software implementation of the expert system of the present invention is to identify where in the network one can substitute the universal equation (14) or universal gate as illustrated in FIG. 2 for one or more operators. This is simply a matter of identifying the logic functions because each logic function can correspond to a single gate or several logic functions can correspond to a single gate when a NOT logical function is involved. FIG. 5 illustrates that 11 universal gates or 11 executions of equation (14) would be required to perform the operations outlined in this problem. Each probabilistic gate or equation execution is identified by a box around one or more operators. Each gate is given a gate number and gates which receive outputs from other gates must have a higher gate number or be at a deeper level in the tree. During the process of simplification, the rules strengths associated with the linkages and the operators become part of the universal equation or gate by storing these values as constants in a local memory. The values of these constants for the system of FIGS. 4 and 5 are set forth in Table 1 below:

TABLE 1

| GATE/CYCLE | FUNCTION | $A_j$ | $B_j$ | $A_k$ | $B_k$ |
|---|---|---|---|---|---|
| 1 | AND | .648 | 0 | .980 | 0 |
| 2 | AND | .500 | 0 | .750 | 0 |
| 3 | AND | 1 | 0 | .801 | 0 |
| 4 | NOT&AND | $-1$ | 1 | 1 | 0 |
| 5 | IMPLIES | .500 | 0 | 0 | 1 |
| 6 | AND | 1 | 0 | 1 | 0 |
| 7 | AND | .300 | 0 | .898 | 0 |
| 8 | NOT&AND | $-1$ | 1 | 1 | 0 |
| 9 | IMPLIES | .898 | 0 | 0 | 1 |
| 10 | IMPLIES | .699 | 0 | 0 | 1 |
| 11 | IMPLIES | .500 | 0 | 0 | 1 |

During operation a control circuit would activate the gates or execute the equation representing the gate in gate numbered order or by level depth to properly cycle the system.

Figure 6:
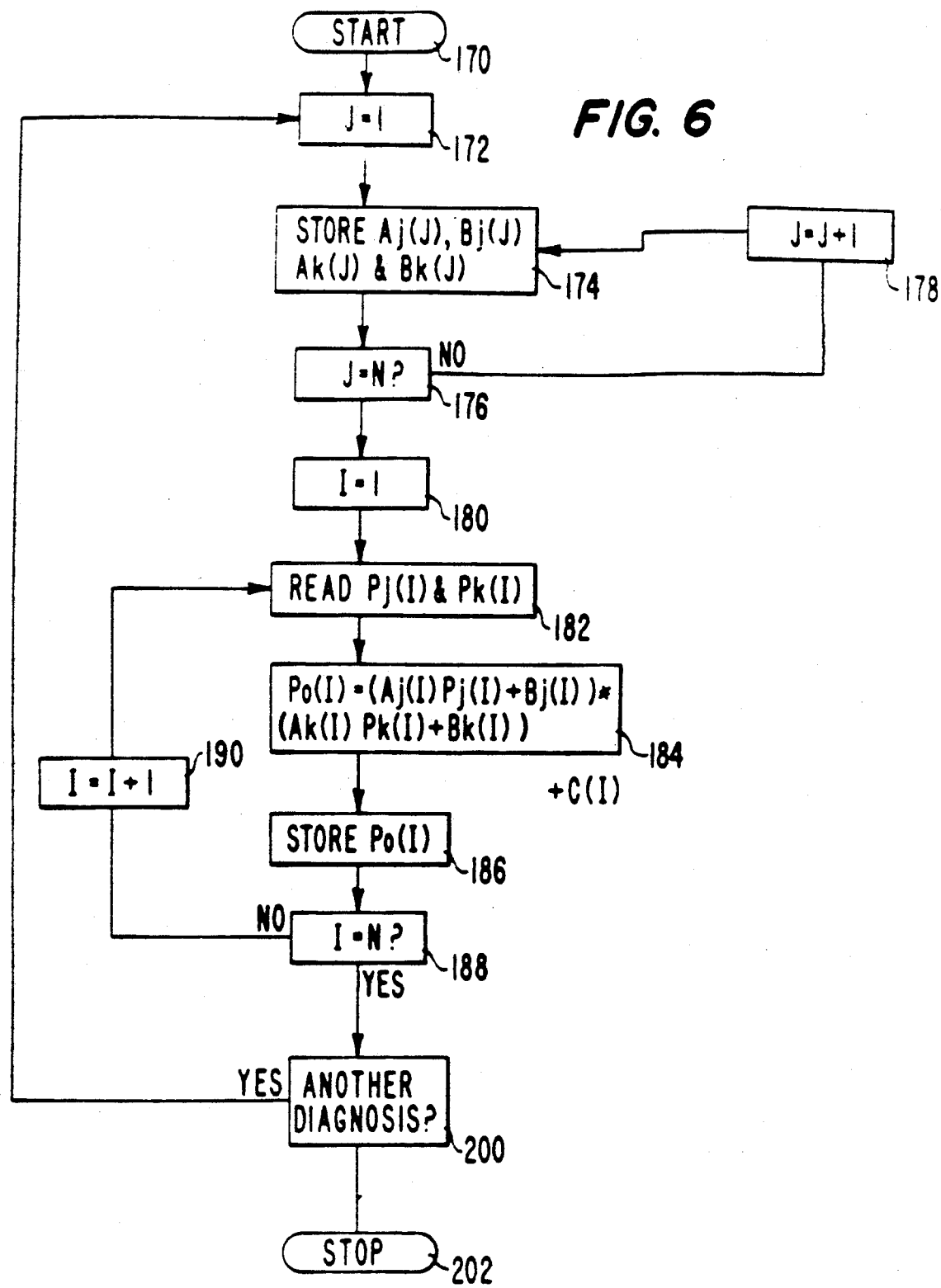
FIG. 6 is a flowchart of a process that will perform the universal gate operations necessary to produce the inferences of FIG. 4.

The process of storing the constants in local memory and executing the expert system represented by FIG. 5 in a single general purpose computer is illustrated in FIG. 6 using the two linear transformation implementation represented by equations (12) and (14). Steps 172 through 178 store the appropriate constants. The value of these constants could be entered by the operator or stored in a nonvolatile memory. The operations illustrated by blocks 180-188 execute equation (14) as illustrated in block 184. The increment I corresponds to the gate number assigned during the decision tree conversion process previously described. Step 184 performs and combines two implications as in equation (7). By setting the constants appropriately as for gate 5, only an implication can be output. The formula illustrated in block 184 can be converted into the three linear transformation embodiment of equation (13) by adding a $+C(I)$ to the formula and storing another constant $C(J)$ in block 174. Step 186 stores the output probability produced in step 184 and this probability can be one of the probabilities read in step 182 during a later cycle which requires that value. One of ordinary skill in the art can modify step 186 to store the output probability in the appropriate storage location for PJ or PK by creating an output to input storage conversion table as illustrated in Table 2. Table 2 represents a conversion table for the network of FIG. 5. In Table 2 the lack of an entry indicates that the output produced by this cycle is an output of the probability of an event occurring, for example gate is an output gate and the gate 9 output is not stored as an input.

TABLE 2

| Device Cycle Output I | Device Output Connection Cycle Input | |
|---|---|---|
| | PJ(N) | PK(N) |
| 1 | 2,7,8 | 6 |
| 2 | 3 | |
| 3 | 4 | 8 |
| 4 | 5,11 | |
| 5 | | |
| 6 | 9 | |
| 7 | | |
| 8 | 10 | |
| 9 | | |
| 10 | | |
| 11 | | |

Figure 7:
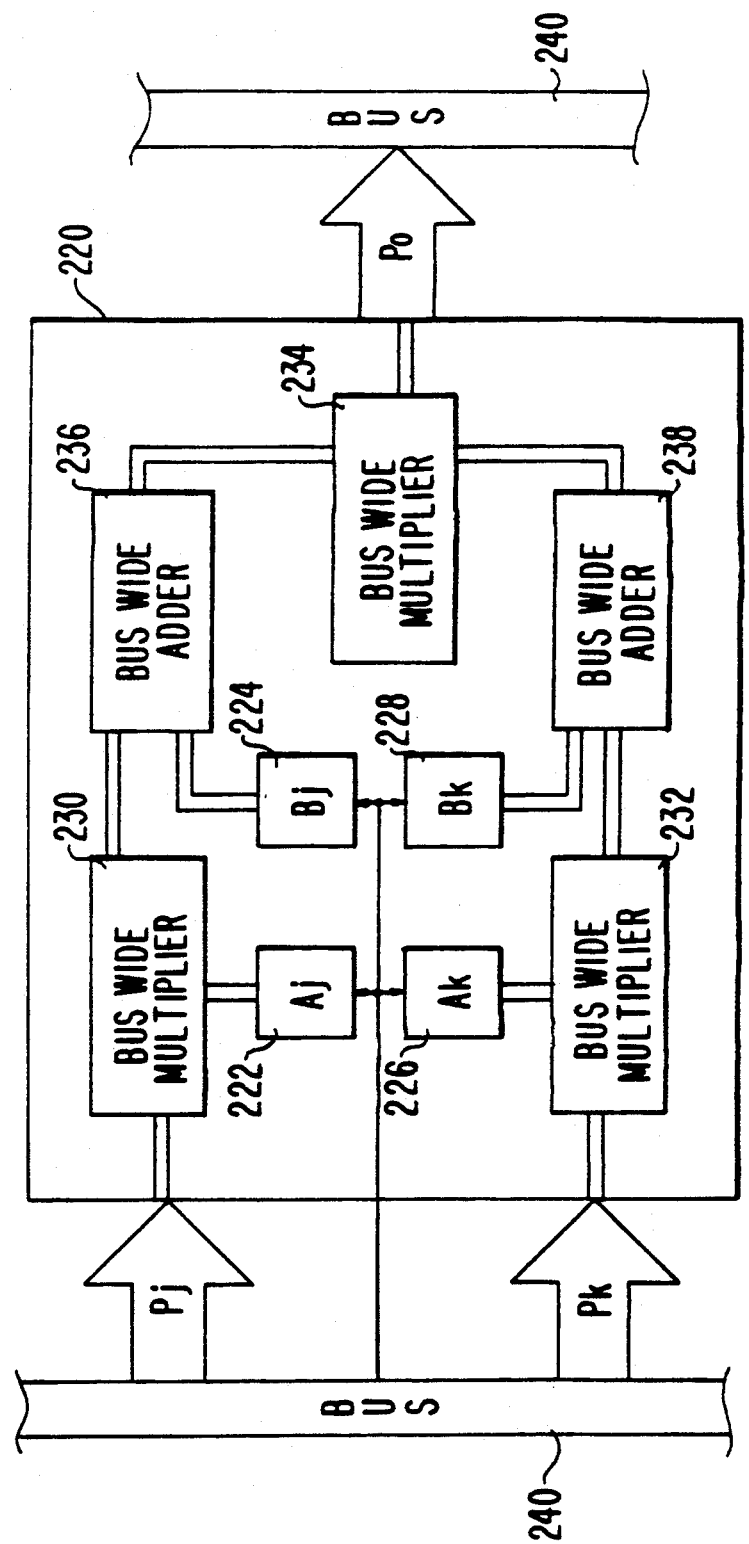
FIG. 7 illustrates a bus wide embodiment of the universal gate.

As previously discussed with respect to FIG. 5 not only can the logic elements be represented as cycles in a computer program as illustrated in FIG. 6, but the logic elements can be represented as a hardwired universal logic gate with the appropriate constants as illustrated in FIG. 2. This hardwired system can be implemented with a universal processing unit 220 capable of processing probability values as illustrated in FIG. 7. This unit 220 can be a single processing unit which is cycled through a load and execute cycle for each of the gates in a network such as in FIG. 5. In such an implementation gate 220 would be cycled eleven times. This unit 220 can also be one of plural units which access a bus 240 in a processor array which will be discussed in more detail later. If the unit 220 is part of an array, conventional bus access logic which includes for example data tag decoders for comparing the destination address of data or constants to the address of the processor is provided. This unit 220, whether a single unit or one of several units in an array, includes conventional registers 222-228 for storing the constants, conventional bus wide multipliers 230-234 and conventional bus wide adders 236 and 238. Implementation of the universal processing unit 220 as illustrated in FIG. 7, will result in a very fast unit, however, duplication of functions is necessary to obtain high speed.

Figure 8:
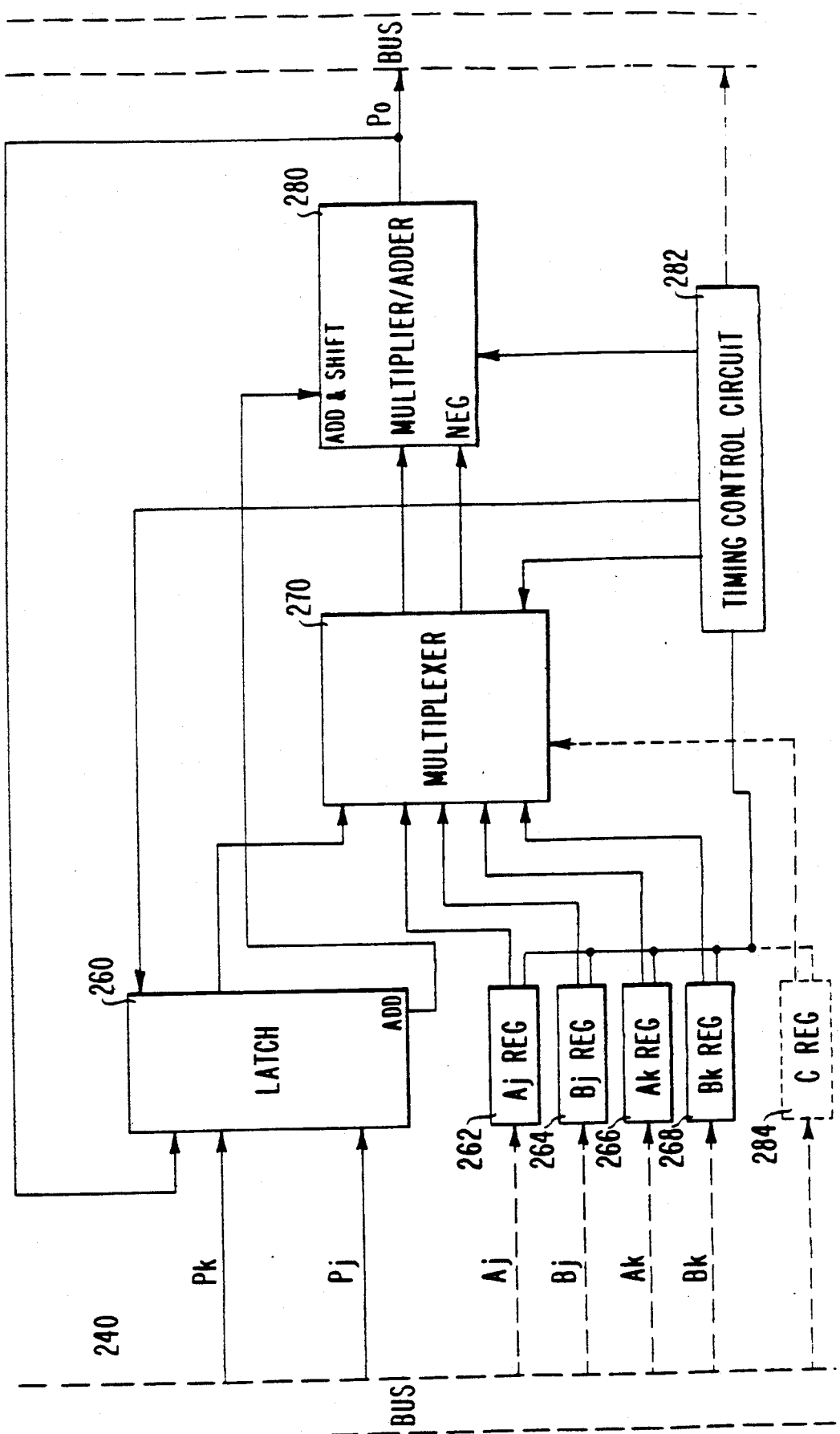
FIG. 8 illustrates a processing element embodiment of the universal gate.

If the universal gate of the present invention is incorporated into an integrated circuit array substantial savings in silicon real estate can be obtained by eliminating the duplication of circuits in FIG. 7 and cycling the unduplicated components in a feedback arrangement to perform the operations of equation (14). Such a more economical multiple operation unit is illustrated in FIG. 8. This more economical unit can also function as a hardwired unit on an integrated circuit chip and be dedicated to a particular task by making a few changes that are within the ordinary skill in the art. Such as, this dedicated unit can be produced by providing permanent storage devices such as ROMs in the unit storing the constants in the permanent storage devices and hardwiring the probability inputs to the appropriate input sources. This unit of FIG. 8 is either connected to the bus 240 or to the inputs of other units and includes a conventional latch 260 which stores the initial input signals PJ and PK and the intermediate values P1 produced by the first two (J and K) cycles of the linear transformation operations and as the multiplicand latch in the third cycle holding $P1_k$. The input signals are preferably 9 bit integer digital representations of probability where the 9bit is used to represent the probability 1.00. When 9 bits are used a maximum error of 0.4% will be produced. By using a higher number of bits the maximum error can be reduced. Also included are conventional memory or register elements 262 through 268 which store the constants associated with each linear transformation. The integer values stored in the latch 260 and registers 262 through 268 are transferred through a conventional multiplexer 270 which can be a single multiplexer six inputs wide or staged two input multiplexers. The multiplexer 270 provides each selected value as the multiplicand to a conventional, partial product, integer multiplier/adder 280 while the shift and add control bits are sequentially supplied by latch 260 to the multiplier 280 to produce the two P1 intermediate results and the output for P0 which is applied to the bus 240, the next gate or output. The storage registers 262 and 266 include a bit that indicates whether the magnituded value represents a positive or negative number. This sign indicator bit is provided to the negative input of the multiplier/adder 280, so that the complement function can be performed. A timing control circuit 282 is provided which activates the various circuits to perform their function as will be described in more detail later. This circuit is shown for convenience of description as contained in a single place when actually the timing control for the multiplexer 270 is found in the multiplexer. The extra register 284 illustrated by dashed lines in FIG. 8 can be added to the unit of FIG. 8 to convert the device into a universal gate which will perform the three linear transformation operations of equation (13) by multiplexing in the contents of the register 284 at the round off cycle.

Figure 9:
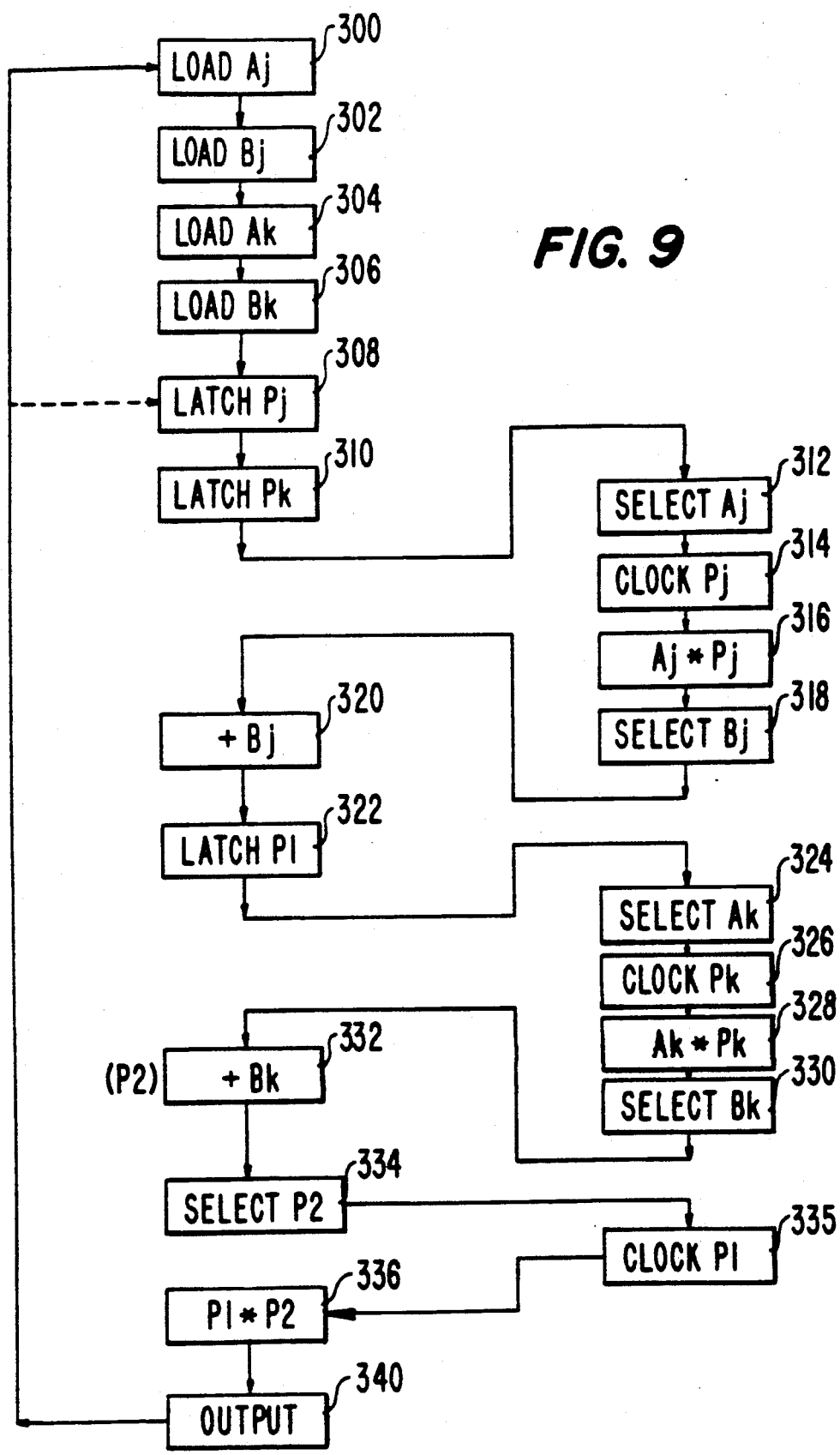
FIG. 9 is a cycle chart of the general operations performed by the device of FIG. 8.

FIG. 9 illustrates the general flow of the operations performed when the unit is used both as a general processing unit configurable in any of the great configurations of FIG. 3 or as a dedicated hardwired unit. If the unit of FIG. 8 is a general purpose unit, first the constants are loaded 300-306 into the memory elements 262-268 and then the input probabilities are latched 308 and 310 into latch 260. The first linear transformation begins with the multiplexer 270 selecting 312 the constant AJ as the multiplicand value and applying it to the multiplier 280. Next, the input value PJ is started shifting 314 and applied to the multiplier 280 and the multiply function is performed 316. Then the constant BJ is selected 318 followed by the execution of the addition function 320 by the multiplier/adder 280. The output of this operation called P1 is then latched 322 into the latch 260. The second linear transformation starts by selecting 324 the next multiplicand constant Ak, then starting clocking of the input probability PK now located in the output position of latch 260 to perform the multiply operation 328 as previously discussed to create the value P2. The selection 330 and addition 332 of the constant BK is then performed. The multiplier/adder 280 now contains the result of the second linear transformation P2 which is latched 333 into 260. To perform the multiplication which combines these two linear transformations, first the P2 value is selected 334 (and shifting is disabled) by the multiplexer 270 and P1 is then clocked 335 to perform multiply operations 336. The results can then be output 340 to the next hardwired unit or output to the bus 240. If the unit of FIG. 8 is performing as a universal gate in an array the process of loading (steps 300-310) the constants and performing the operations (steps 312-340) are executed again. If, however, the unit of FIG. 8 is acting as a dedicated gate the operation returns to the step 308 which begins the process of inputting new probability input signals.

Figure 10A:
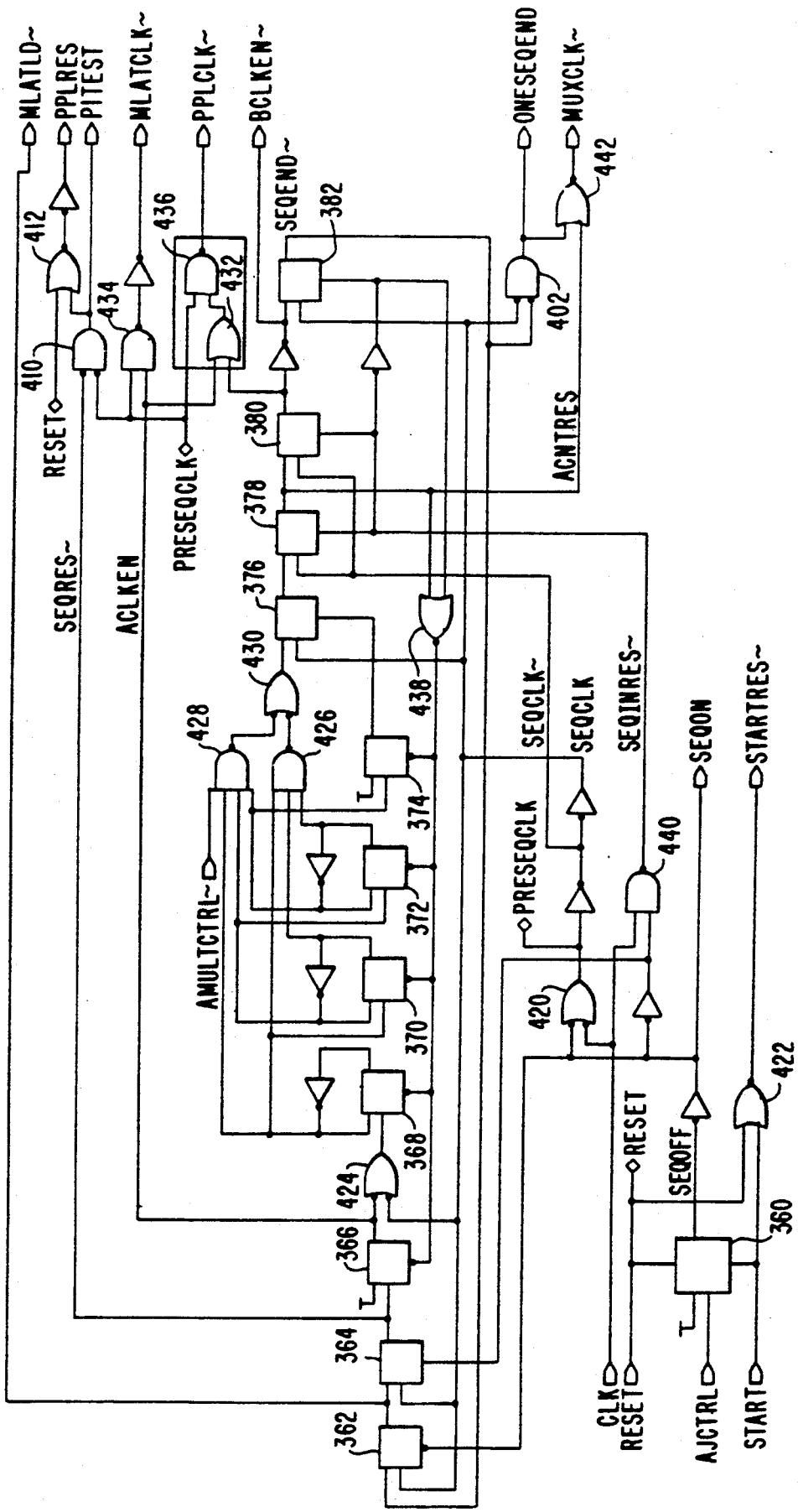
FIGS. 10A and 10B shows the details of the timing control of FIG. 8.
Figure 10B:
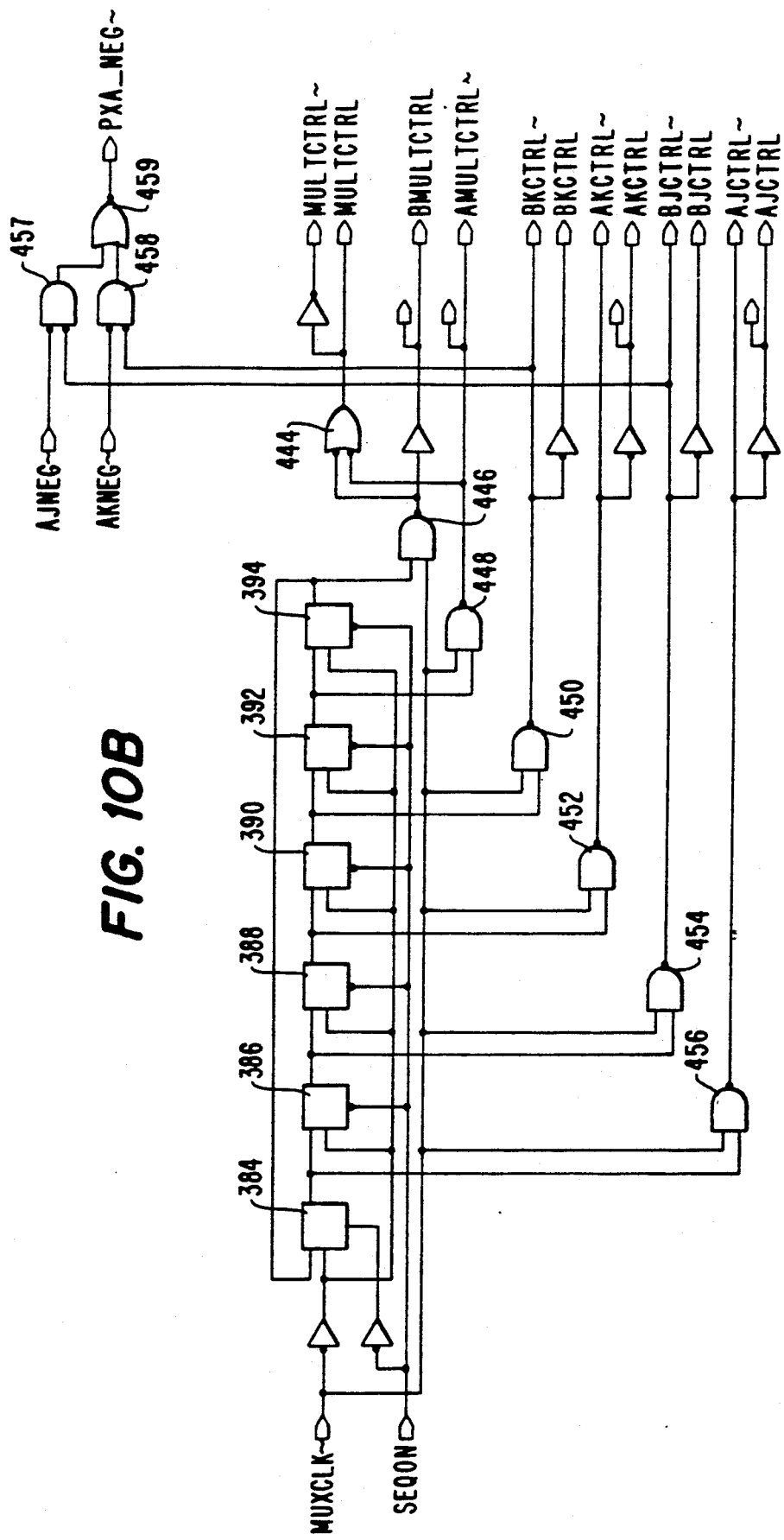

A timing control circuit 282 and the timing control within unit 270 which will provide the necessary timing control signals for the steps 308-336 is illustrated in FIGS. 10A and 10B. The circuit illustrated in FIGS. 10A and 10B is a positive clock logic circuit and produces the positive clock logic signals illustrated in the timing diagram of FIG. 11. The timing control circuit of FIGS. 10A and 10B includes plural D-flip flops 360-394, AND (410), NAND (436), OR (412) and NOR (422) functions, which will be recognized by those of ordinary skill, and several signal amplification and inverter gates not provided with reference numbers. Flip-flop 360 is the start flip flop while flip flops 362 and 364 are load function flip flops. The 366 flip-flop is called the multiply ripple carry counter enable flip-flop and provides a P times A multiplier ripple carry counter enable to enable counting of the P times A number of clocks. Flip flops 368-376 perform the P times A counting while 378 resets the P times A clock counter and delay of the multiplicand switching to B circuitry. Flip-flop 380 is the B clock flip flop while 382 is a sequence over indicator that cycles three times. Flip flops 384-394 act as multiplicand multiplexer selectors with only one active at a time.

Some of the signal label abbreviations illustrated on FIGS. 10A and 10B are also illustrated on the timing diagram of FIG. 11 and the meaning of these abbreviations are set forth in Table 3 below. The timing diagram of FIG. 11 shows high true logic signals, however, those of ordinary skill will recognize that low true logic can be used as a substitute.

TABLE 3

| | Initialization Signals |
| --- | --- |
| CLK | Circuit Oscillator Clock |
| RESET | Circuit Power-on Reset |
| START | Start Calculation Pulse |
| | Control Sequencer Timing Signals |
| STARTRES | Start or Reset Initiate Pulse |
| SEQON | Sequence On |
| SEQINRES | Control Sequencer Off or In Reset |
| SEQCLK | Control Sequencer Clock |
| MLATLD | Multiplier Latch Load |
| PPLRES | Multiply Partial Product Latch Reset |
| PITEST | Probability Input Error Test Pulse |
| ACLKEN | Multiply Clock Enable |
| ACNTRES | Multiply Clock Counter Reset |
| BCLKEN | Add Clock Enable |
| PPLCLK | Partial Product Latch Multiply/Add Clock |
| SEQEND | One Calculation Sequence Ended |
| ONESEQEND | One Sequence End Clock |
| | Multiplicand Multiplexer Control Signals |
| MUXCLK | Multiplexer Select Clock |
| AJCTRL | AJ Control |
| BJCTRL | BJ Control |
| AKCTRL | AK Control |
| BKCTRL | BK Control |
| AMULTCTRL | A Multiplied Control |
| BMULTCTRL | B Multiplied Control |
| MULTCTRL | A or B Multiplied Controls |
| AJNEG | Sign of AJ Magnitude Is Negative |
| AKNEG | Sign of AK Magnitude Is Negative |
| PXA NEG | P times A Calculation Is Negative Test |

Figure 11:
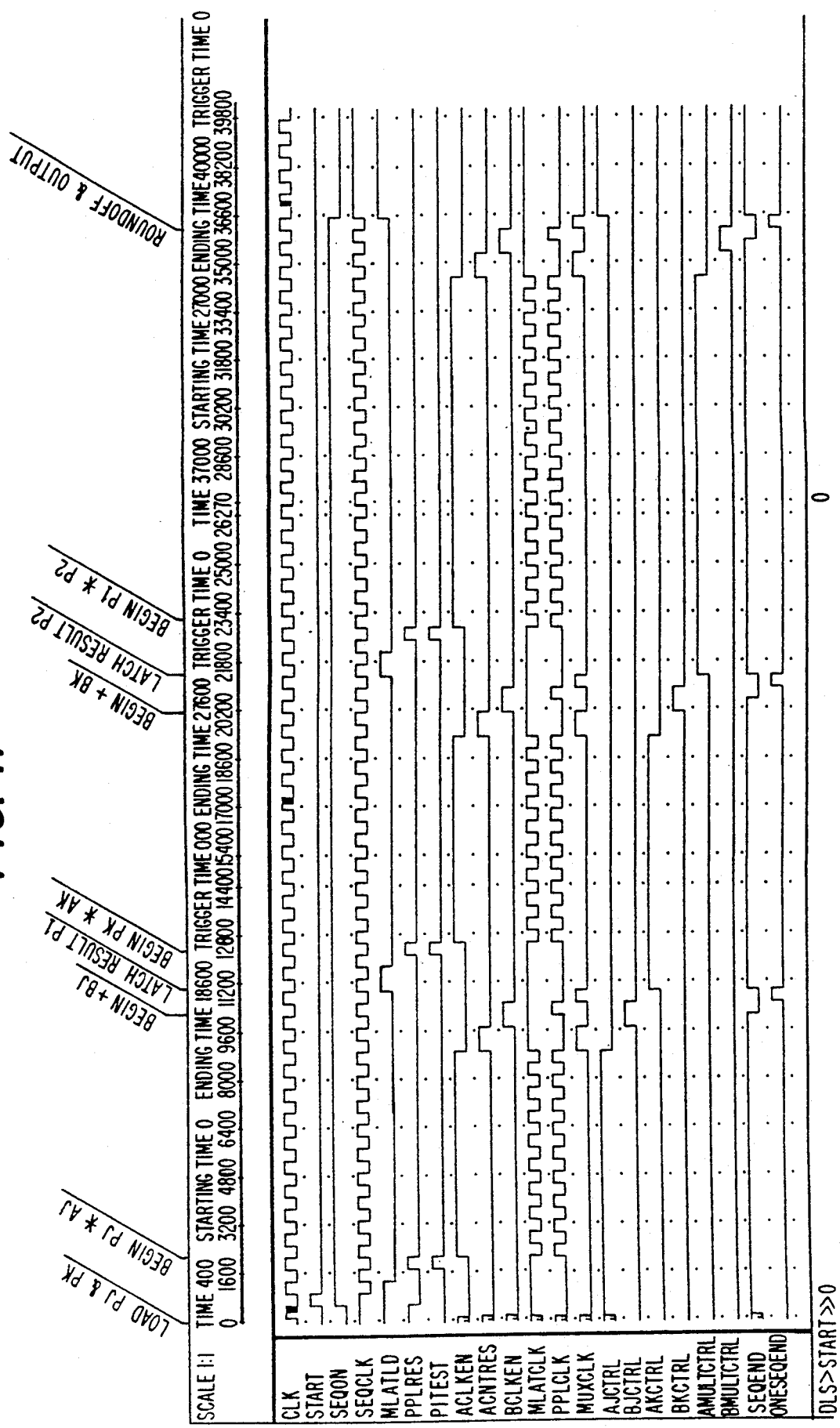
FIG. 11 is the timing signal diagram for timing control.

Along the top of FIG. 11 indicators have been provided which indicate the beginning of the various operations which are controlled by the circuit of FIG. 10.

Initially the control circuitry 282 of FIG. 10 is held in the idle or ready to initiate state, that is, SEQON is inactive while MLATLD and AJCTRL are active. In this state, the MLATLD active operates to control the loading of conventional latch 260 with the input probabilities PJ and PK. At this point, the continuous clock input CLK is not passed onto the sequencer MLATLD through SEQEND, that is, SEQCLK is disabled.

A start of operation pulse START activates SEQON, thus relinquishing the start latch 360 allowing SEQCLK to begin the sequence series. If error detection latches are provided to detect underflow and overflow the can be reset at this time. The PPLRES pulse first resets or initializes conventional multiplication product latches found in the multiplier/adder 280.

The present invention performs multiplication using a conventional add and shift operation using a conventional multiplier/adder 280 and conventional shifting techniques as described hereinafter. Following the PPLRES-stage, nine clock pulses gated at both MLATCLK and PPLCLK are enabled with ACLKEN. These pulses propagate to the conventional multiplier and product latch circuitry, respectively, providing the PJ* (magnitude of AJ) calculation. These nine pulses are counted using a conventional ripple counter (370-374) which terminates following the WAIT sequence state (376) by allowing ACNTRES to reset the ACLKEN latch 366 and the ripple counter latches (368-374). The multiply is accomplished by shifting the 9-bit PJ term through the ADD output of the multiplier latch 260. Each bit output by the ADD output of latch 260 selects whether the product latch of the multiplier/adder 28 stores an add-and-shift data (active) or shift data (inactive) operation. The add-and-shift operation totals the partial product residing in the multiplication product latches with the multiplexed multiplicand from the multiplexer 270 which is presently selecting the magnitude of the AJ constant via AJCTRL. Each right shifted intermediate result is placed back in the partial product latches of the multiplier/adder 280 by the adder 280 in a conventional manner. The additions are preferably accomplished using conventional carry look-ahead circuitry rather than ripple carry full adders to increase the speed of calculation. A shifted left PJ* (magnitude of AJ) final product remains in the product latches of the multiplier/adder 280 at the completion of the nine PPLCLK clock cycles. During this operation, the next multiplier value, PK, has been shifted into position in the latch 260.

The resetting of the ACLKEN ripple counter by ACNTRES also changes, via MUXCLK, the multiplexed multiplicand control from AJCTRL to BJCTRL to select BJ. The control sequencer then generates BCLKEN which provides one more PPLCLK to the multiplication circuitry. BCLKEN allows this circuitry to add-and-shift the PJ*AJ product to the BJ constant, placing the final sum in the product latches of the adder 280 (now having its implied decimal point aligned correctly with the shift function). Note that during this summation, PJ*AJ or its two's complement, if the NEG input to the unit 280 is active, is applied to the adder from the partial product latch, thus adding or subtracting, respectively, the magnitudes as required.

The next sequencer state SEQEND is entered, which ends one sequencer series. Here, the multiplicand multiplexer control is changed to AKCTRL by the MUXCLK clock. Also generated at this time is the control signal ONESEQEND which can gate any overflow/underflow detection circuits. At this time an underflow can be flagged if the final sum in the product latches is negative. This signal can latch an underflow, or less than zero, error indicator and reset the product latch to its minimum value, that is, zero. An overflow can be flagged if the final sum is positive and greater than the output bus bit range. When an overflow error indicator is latched, the output should be forced to the maximum probability of 1.00. This condition should hold the output probability in this state to the completion of the probability processing function.

The second time through the sequencer series is similar to the first with the exception that the $[(P_k*A_k)+B_K]$ term is calculated. The first stage of the control sequence differs in that MLATLD loads the J output (P1) term as calculated above into the later part of the latch 260 while preserving PK now located in the forepart of this latch 260. Completion of this series ends with the 15 bit J calculation (P1) in the forepart of the latch 260 ready to be shifted out of the ADD output and the 15 bit K term calculation (P2) in the output positions of the latch of the multiplier/adder 280 ready to be loaded into the later part of latch 260. Any error detection circuits will also have operated as described above as the multiplicand multiplexer control is advanced to AMULTCTRL.

The third and final time through the sequencer completes the last multiplication in the probability function, that is, the K term (P2) is multiplied by the J term (P1). The first stage of the control sequence loads the K term (P2), which was processed in the second sequence series, from the multiplier/adder partial product latches into the later part of the multiplier latch 260. This term is used as the multiplicand during this multiply process and is, therefore, inhibited from shifting as the J term multiplier (P1) is shifted through the forepart of this latch 260. Since the multiplier term is 15-bits, fifteen PPLCLK pulses are generated with the ACLKEN ripple counter during this sequence rather than nine with 426 providing the gating for fifteen counts and 428 providing gating for nine counts. Completion of the ACLKEN stage provides a 9-bit output probability residing in the output latches of the multiplier 280. The AMULTCTRL is followed by BMULTCTRL and the BCLKEN stage, which adds and shifts a zero constant with round-off producing the final probability in the adders. Since positive J and K terms are multiplied, an underflow error cannot be detected in this sequence. An overflow error, however, can be detected for a number greater than 1.00 and can be processed as described above.

The change of the multiplexer control from the last stage BMULTCTRL to the initial stage, AJCTRL, clocks the SEQON latch 360, thus changing the probability calculation to the idle state. The results reside in the output latches of the multiplier adder 280.

Most expert system problems are wider than they are deep, that is, parallel processing tends to dominate over sequential processing. With hard-wired expert systems, the requirement for some sequential processing results in under utilization of computational resources. Specifically, it is inefficient to carry out sequential processing while leaving parallel processing units idle. Decision trees implemented in hardware as illustrated in FIG. 5 can achieve very high processing speeds by taking advantage of parallel processing architectures but the total utilization of resources is usually poor because of the sequential processing needs. As previously discussed an expert system is a collection of decision trees. Any decision tree can be constructed as a binary tree. Each binary tree can be broken up into subsets of smaller symmetric binary trees from which the entire tree is constructed. The number of nodes chosen in each such symmetric tree could vary from a minimum of one up to a maximum sufficient to contain the original binary tree (that is, a number between the number of nodes, N, in the original binary tree and $N^2-1$) A hardwired expert system realization is this collection of binary trees. If the number of nodes in a subset is small, then the number of interconnections (via a common bus) is very large. This is undesirable. On the other hand, if the number of nodes in a subset is large then the amount of computational resources which is underutilized is large. This too is undesirable. A practical trade off must be chosen. The present invention provides a practical implementation of decision trees that simultaneously achieves minimal bus contention and optimal processor utilization.

Figure 12:
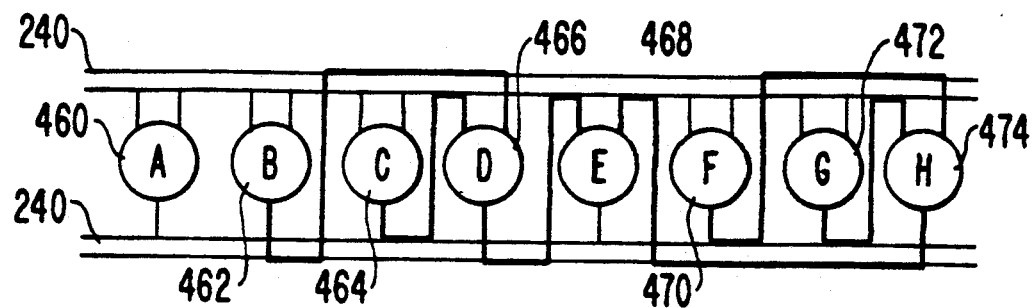
FIG. 12 depicts a processor group for producing an expert system.

Each primitive processing element, as illustrated in FIG. 2, FIG. 7 or FIG. 8, consists of a node with two inputs and one output, such as is represented by element A (460) in FIG. 12. The inputs can come off a bus and the output can go to a bus. These two buses are implemented as a single common bus 240. In principle, it would be possible to connect all nodes in the same way and transfer all signals over the common bus 240. However, as discussed more explicitly below, this leads to under utilization of the computational resources.

One aspect of the present invention is a way of integrating the processing elements so that computational resource utilization is improved. A second aspect of the invention is moving, as much as possible, information transfer from the common bus into internal, fixed, node-to-node transfers.

Eight processing elements can be used as a basic building block to build a binary tree as illustrated by the solid lines representing bus transfers in FIG. 12. The inputs of the eight processing elements A, B, C, D, E, F, G and H (460-474) are obtained directly from the common bus 240. Through the common bus 240, the outputs of B and C are transferred to element D and the outputs of F and G are transferred to element H, after which, the outputs of D and H are transferred to element E. This basic building block is not very efficient because the common bus 240 is loaded not only with input and output signals but also with intermediate signals. The intermediate signals come from the elements B, C, D, F, G and H.

Figure 13:
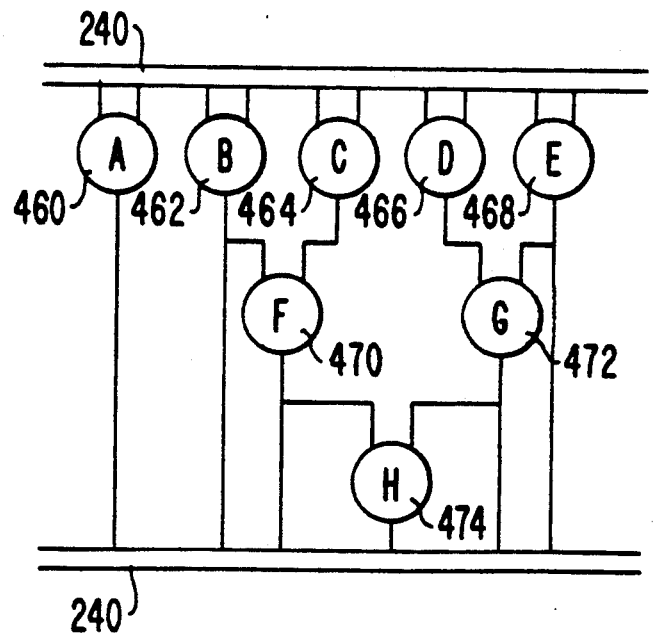
FIG. 13 illustrates the group of FIG. 12 arranged as a binary tree building block.

Another way to build this basic building block is shown in the binary tree diagram illustrated in FIG. 13. The inputs of the first five elements A, B, C, D and E are provided directly by the common bus 240. The outputs of B and C are hardwired to an element F in the second row, the outputs of D and E are hard-wired to an element G in the second row, and the outputs from F and G are hardwired to the inputs of element H in the third row. This basic building block structure reduces bus contention because of the hardwiring of elements B and C to F, D and E to G, and F and G to H.

Figure 14:
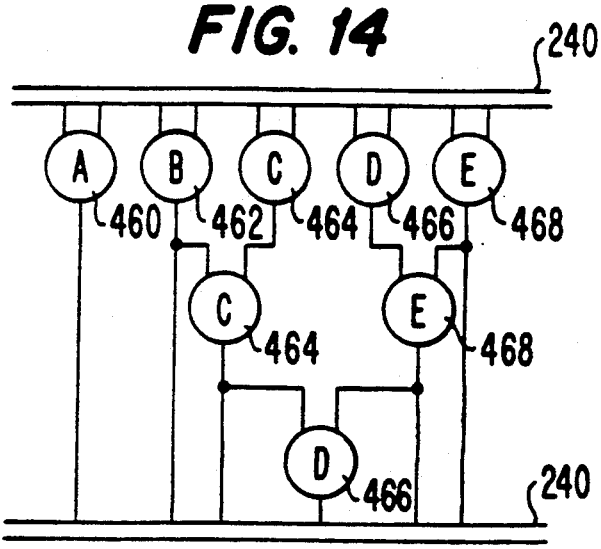
FIG. 14 depicts the group of FIG. 13 reduced to a virtual binary tree.
Figure 15:
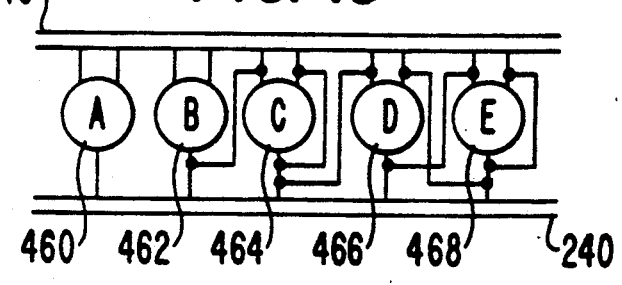
FIG. 15 illustrates a virtual basic building block which provides eight virtual processors using five physical processors.

A third way to build this basic building block in accordance with the present invention is shown as a virtual binary tree in FIGS. 14 and 15. The outputs of B and C are fed back into C, an otherwise idle element, one major clock cycle later, the outputs of D and E are fed back into E, another idle element, in this same later major clock cycle, and then, these new outputs from C and E are fed into D, another idle element, an additional major clock cycle later. The second C calculation can be performed while D and E are being loaded or calculated to during the second E calculation. In order to accomplish this, the elements C, D and E are reinitialized from a bank of internal constant storage registers rather than the single constant storage registers of FIG. 8. In FIG. 14, the elements in the second and third rows are labeled to show their reuse of otherwise idle processing capacity one and two major clock cycles after the start of processing. The virtual binary tree as illustrated in FIG. 14 when produced as an eight processor basic building block which includes five physical processors would be constructed with the hardwired connections as illustrated in FIG. 15. With only five actual processing elements A, B, C, D, and E, we have achieved the effect of eight processing elements and improved utilization by 37.5 percent. An eight virtual processing element virtual binary tree implementation has five physical processing elements without the present invention, the outputs from B, C, D and E, as well as the later outputs from BC and DE, would have had to be transferred back via the common bus while with the invention they need not appear on the common bus at all. With the 8-processing element configuration, illustrated above, the user, if desired, can obtain the following six outputs: A, B, E, BC, DE, and BCDE. Note especially that the three outputs BC, DE and BCDE have been computed without reaccessing the common bus. If the user chooses to obtain the optional outputs it would, of course, increase bus contention.

Figure 16:
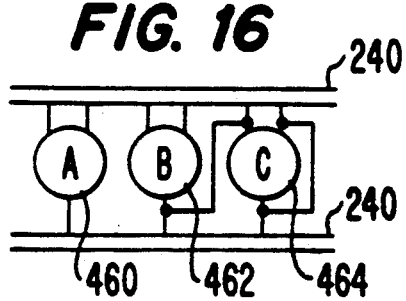
FIG. 16 is a virtual basic building block which provides four virtual processors using three physical processors.
Figure 17:
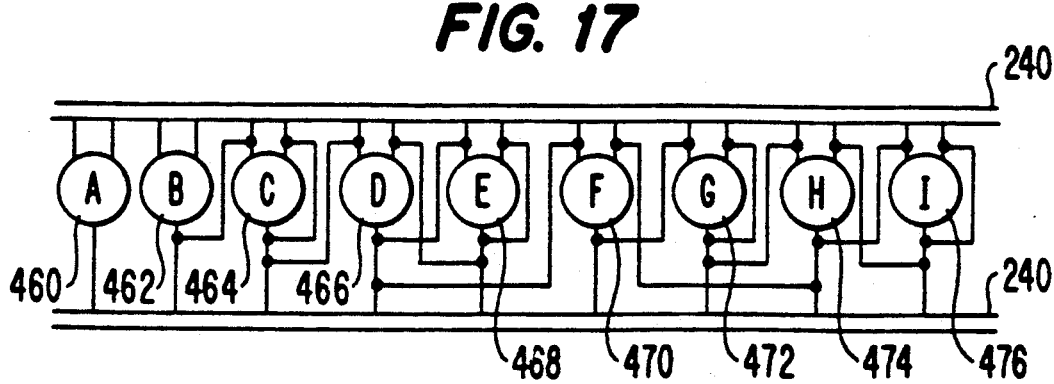
FIG. 17 is a virtual basic building block which provides sixteen virtual processors using nine physical processors.

By extension of the above-discussed virtual binary tree creation principals, virtual binary trees and basic building blocks for configurations which implement a four processor basic building block, as illustrated in FIG. 16 using three physical processors, or a 16 processor basic building block using nine physical processors as illustrated in FIG. 17 can be created. This process of creating virtual basic building blocks can be extended to an arbitrarily large number. The four processor basic building block which uses three physical processors as illustrated in FIG. 16 provides an improved hardware utilization of 25% and the 16 processor basic building block which utilizes nine physical processors provides a utilization improvement of 43.8%.

Using the virtual binary tree approach to creating basic building blocks for a processor array the percent utilization improvement can be determined as set forth the equations below:

$$\text{Effective Number of Processors} = 2^n \quad (36)$$

$$\text{Number of Output Lines} = 2n \quad (37)$$

$$\text{Number of Input Lines} = 2^n + 2 \quad (38)$$

$$\text{Number of Physical Processors} = 2^{n-1} + 1 \quad (39)$$

$$\text{Percent Utilization Improvement} = 100\,(0.5 - 2^{-n}) \quad (40)$$

where lowercase n is the number of layers. For example, when the number of layers is four, the effective number of processors is 16, the number of output lines is 8, the number of input lines is 18, the physical number of processors is 9 and the percent utilization is as previously mentioned is 3.8%. If the number of layers is increased to 8, the effective number of processors is increased to 256, the number of output lines is increased to 16, the number of input lines is increased to 258, the number of physical processors is increased to 129 and the percent utilization is 49.6%.

When the present invention is used with particular size binary trees, the number of physical processors based on the number of virtual processors needed can be determined using the equations below:

$$\text{Binary Tree Size (\# of Elements)} = 2^n - 1 \quad (41)$$

$$\text{Number of Virtual Processors} = 2^c \quad (42)$$

$$\text{Number of Physical Processors} = (2^{n-1} + 1)\, 2^{n-c} \quad (43)$$

where c is the root number assigned to the virtual processor unit. Using the above equations for example if the number of layers is 8 the binary tree size is 255 and a basic building block with four virtual processors is chosen, c=2, 192 physical processors are necessary, and if a virtual processor number size of 16 is chosen as the basic building block, c=4 and the number of actual physical processors is 144. When the number of output bus contentions is the criteria of most importance, the table below can be used to optimize the number of bus contentions based on the number of layers or the binary tree size by selecting an appropriate number of virtual processors.

TABLE 4

| Number of Layers | Binary Tree Size | Output Bus Contention |||||||||
|---|---|---|---|---|---|---|---|---|---|---|
| | | Basic Unit Type ||||||||
| | | 1 | 2 | 3 | 4 | 5 | 6 | 7 | 8 | C |
| 1 | 1 | 2 | — | — | — | — | — | — | — | |
| 2 | 3 | 4 | 4 | — | — | — | — | — | — | |
| 3 | 7 | 8 | 8 | 6 | — | — | — | — | — | |
| 4 | 15 | 16 | 16 | 12 | 8 | — | — | — | — | |
| 5 | 31 | 32 | 32 | 24 | 16 | 10 | — | — | — | |
| 6 | 63 | 64 | 64 | 48 | 32 | 20 | 12 | — | — | |
| 7 | 127 | 128 | 128 | 96 | 64 | 40 | 24 | 14 | — | |
| 8 | 255 | 256 | 256 | 192 | 128 | 80 | 48 | 28 | 16 | |

For example, if the number of layers is 6 and number or virtual processors chosen is $2^c$ with c equal 4 the number of virtual processors is 16 and the number of output bus contentions is 32.

Figure 18:
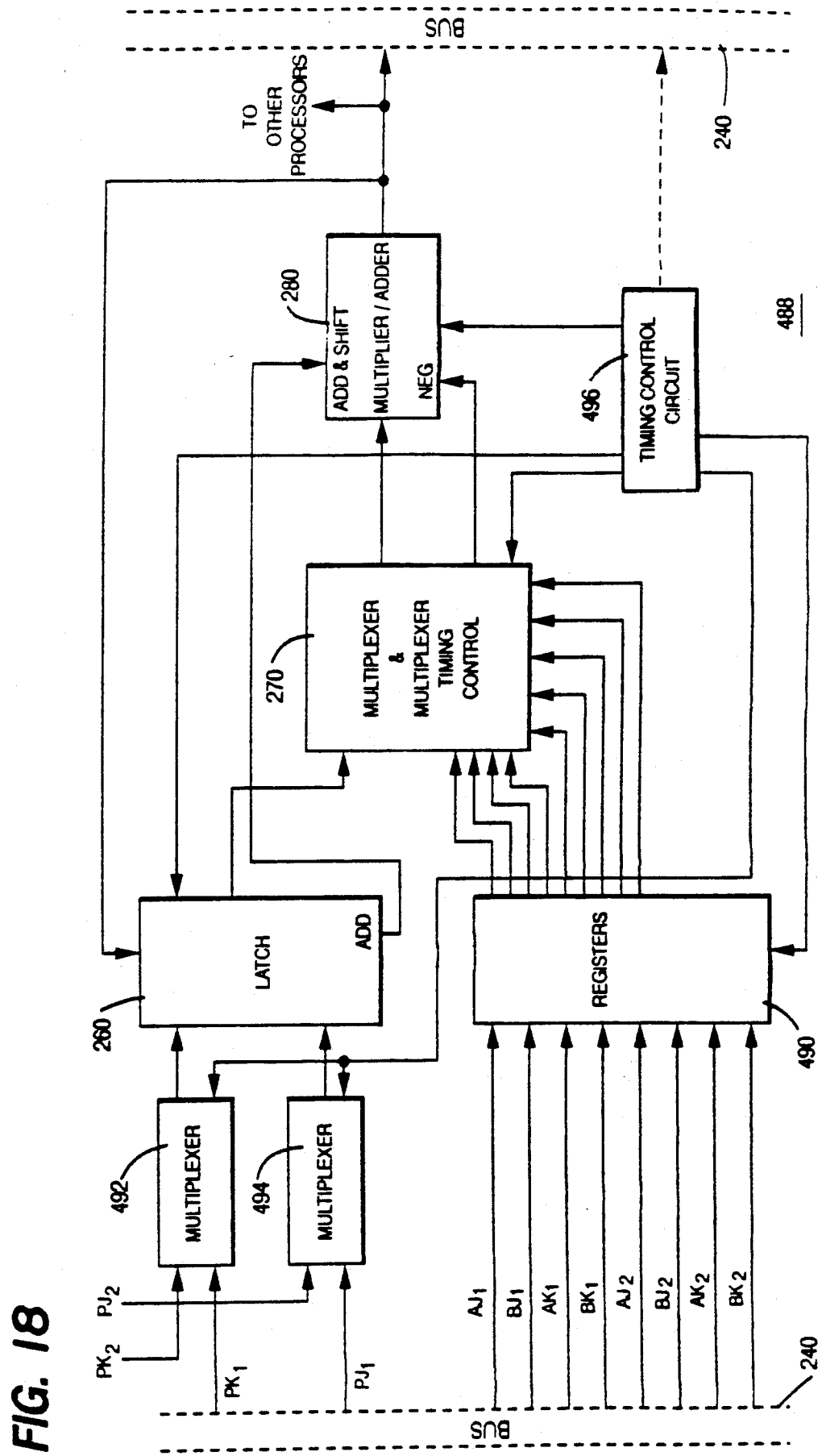
FIG. 18 depicts the two input pair processing elements of FIGS. 15-17.
Figure 18A:
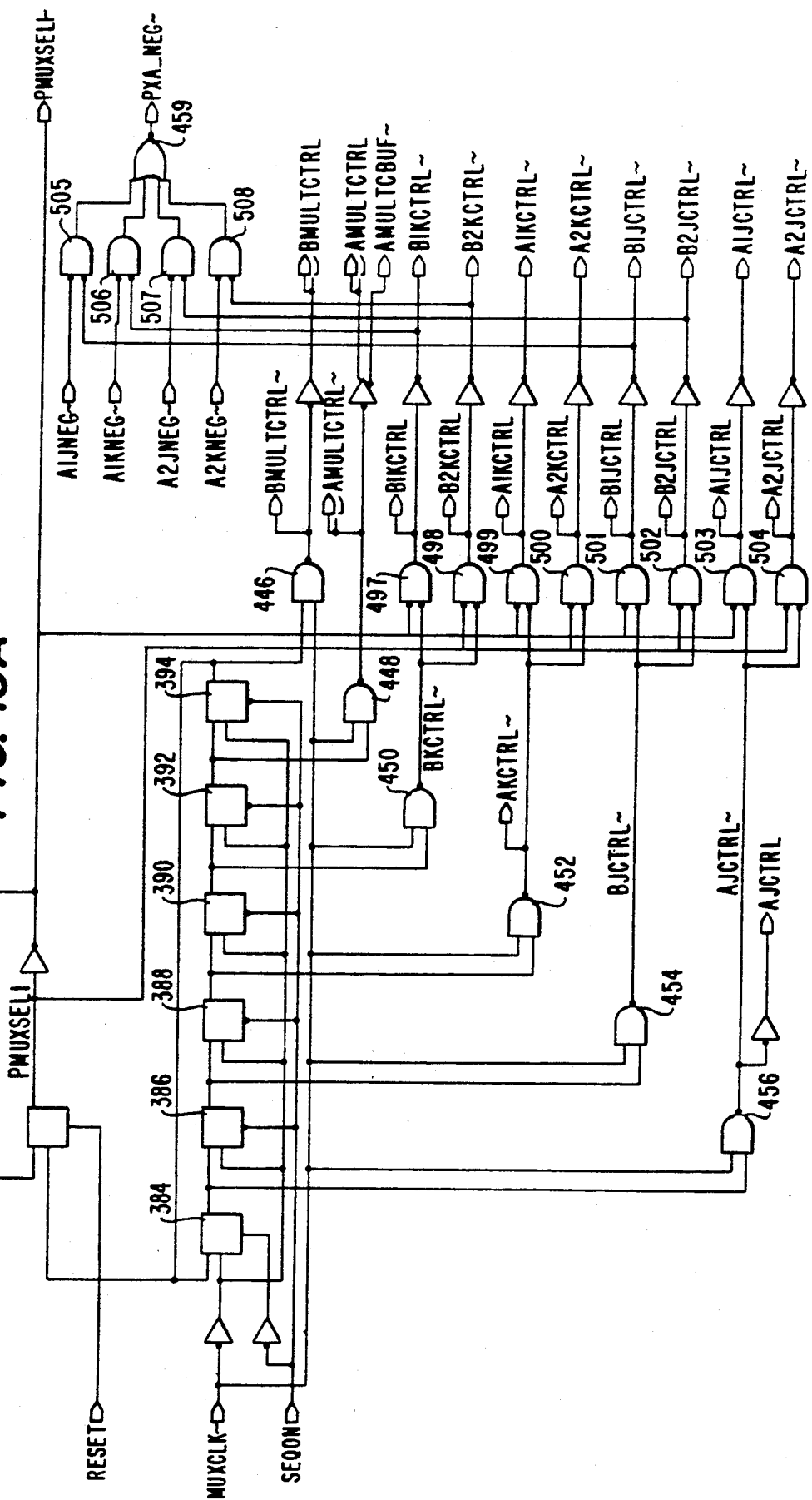
FIG. 18A illustrates a portion of timing control.
Figure 19:
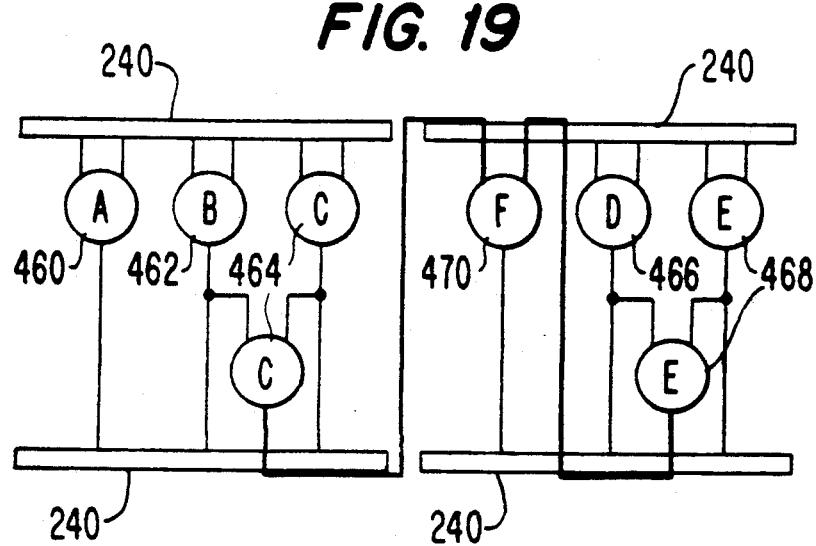
FIG. 19 illustrates how to build an eight processing element device from a pair of four processing element blocks.
Figure 20:
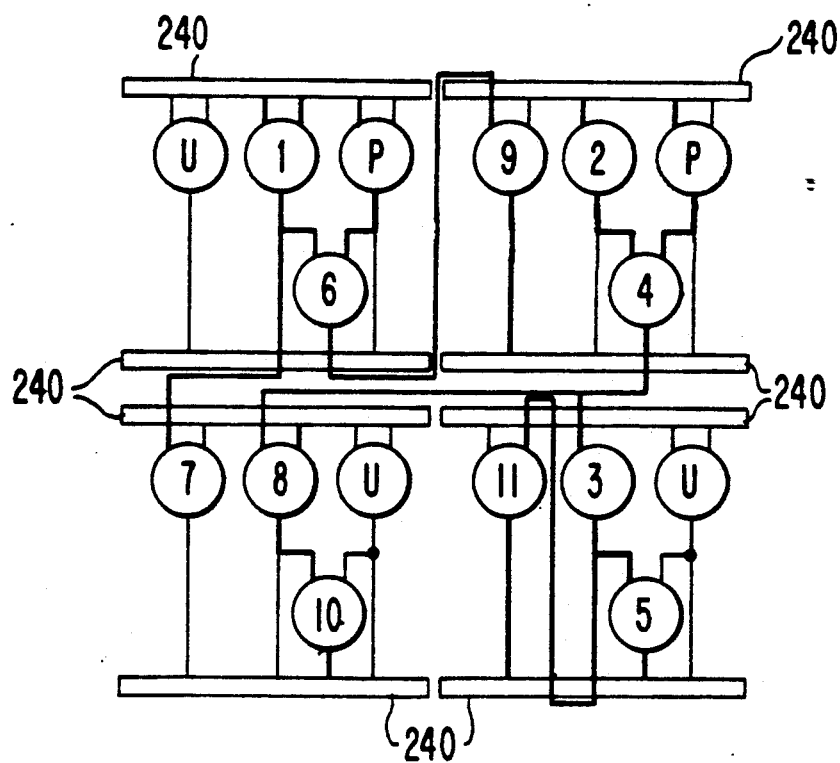
FIG. 20 shows how the network of FIG. 5 is implemented using four of the four element virtual processing element building blocks of FIG. 16.
Figure 21:
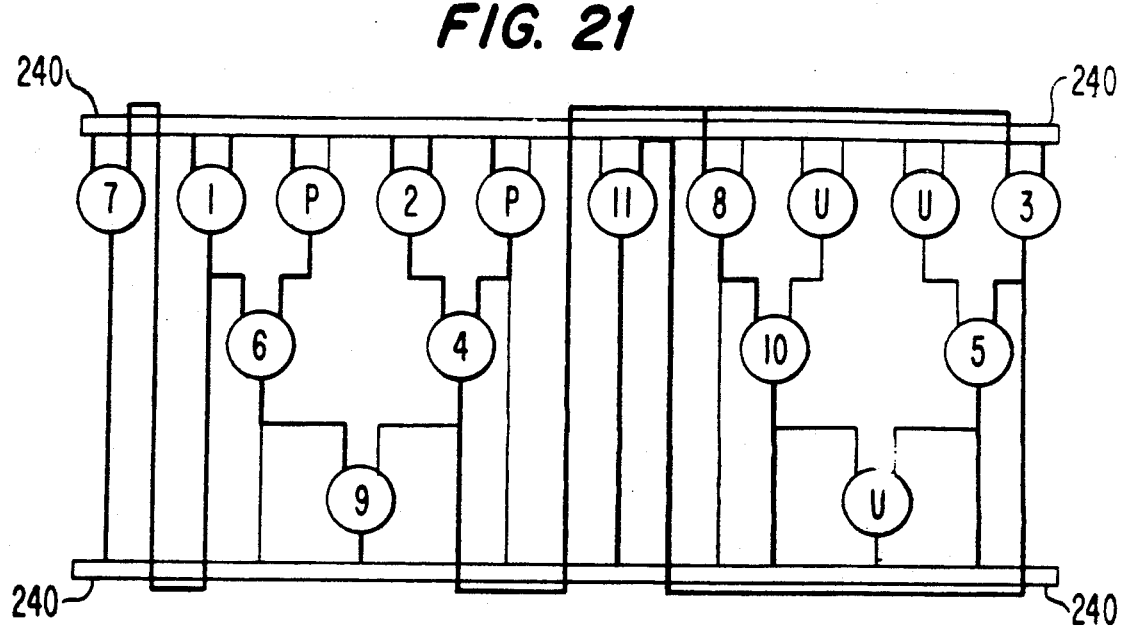
FIG. 21 shows how the network of FIG. 5 is produced using a pair of the eight element building blocks of FIG. 15.

Because each virtual binary tree basic building block includes at least one processor, for example, processor C, which requires two pairs of probability inputs, the basic processing unit as illustrated in FIG. 8 must be modified as illustrated in FIG. 18. Rather than using a four register set as illustrated in FIG. 18, a bank of registers 490 can be used, which includes 8 registers if the two linear transformation equation (12) is executed and 10 registers if the three linear transformation of equation (13) is executed. In between the bus 240 and the latches 260, multiplexers 492 and 494 are provided which select appropriate input probability signal values for storage in the latches 260. With respect to FIG. 18 the circuit components in the timing control circuit 496 are illustrated in FIG. 10A while the timing control circuitry of 270 is illustrated in FIG. 18A. This circuit is the same as that in FIG. 10B with the addition of a cycle selection flip flop 496 and gates 497-508 which control selections of the constants. This allows the timing diagram of FIG. 11 to essentially be duplicated for the two input pair element as illustrated by element C in FIG. 15. From the basic building blocks illustrated in FIGS. 15, 16 and 17 other larger processing element devices can be constructed. For example, an 8 virtual processing element device can be constructed from two 4 virtual processing element devices as illustrated in FIG. 19. Extending this approach allows a 16 virtual processor element device to be constructed from four 4 virtual processing element devices as illustrated in FIG. 20. The same principal applies to building much larger virtual processing element devices using the 8 virtual processing element device as a basic building block as illustrated in FIG. 21. A 16 virtual processing element basic building block as well as larger numbered virtual processing element building blocks may be used to build larger devices.

When the expert system represented by FIG. 5 is implemented using the 4 virtual processing element basic unit, an arrangement as illustrated in FIG. 20 will be produced where the numbers in the circles correspond to the gates designated in FIG. 5 and U indicates a unused processor and a P represents a passive processor which acts as a storage or data transfer element. FIG. 21 illustrates the expert system of FIG. 5 implemented using the 8 virtual processing element basic building block. By comparing FIGS. 20 and 21 it will be apparent that the number of bus contentions is higher in FIG. 20 than it is in FIG. 21 while the number of passive and unused processing elements remains the same. The tradeoff of sizing the basic building block to the particular expert system being implemented is generally a trade off between processor utilization and bus contention as previously discussed.

Figure 22:
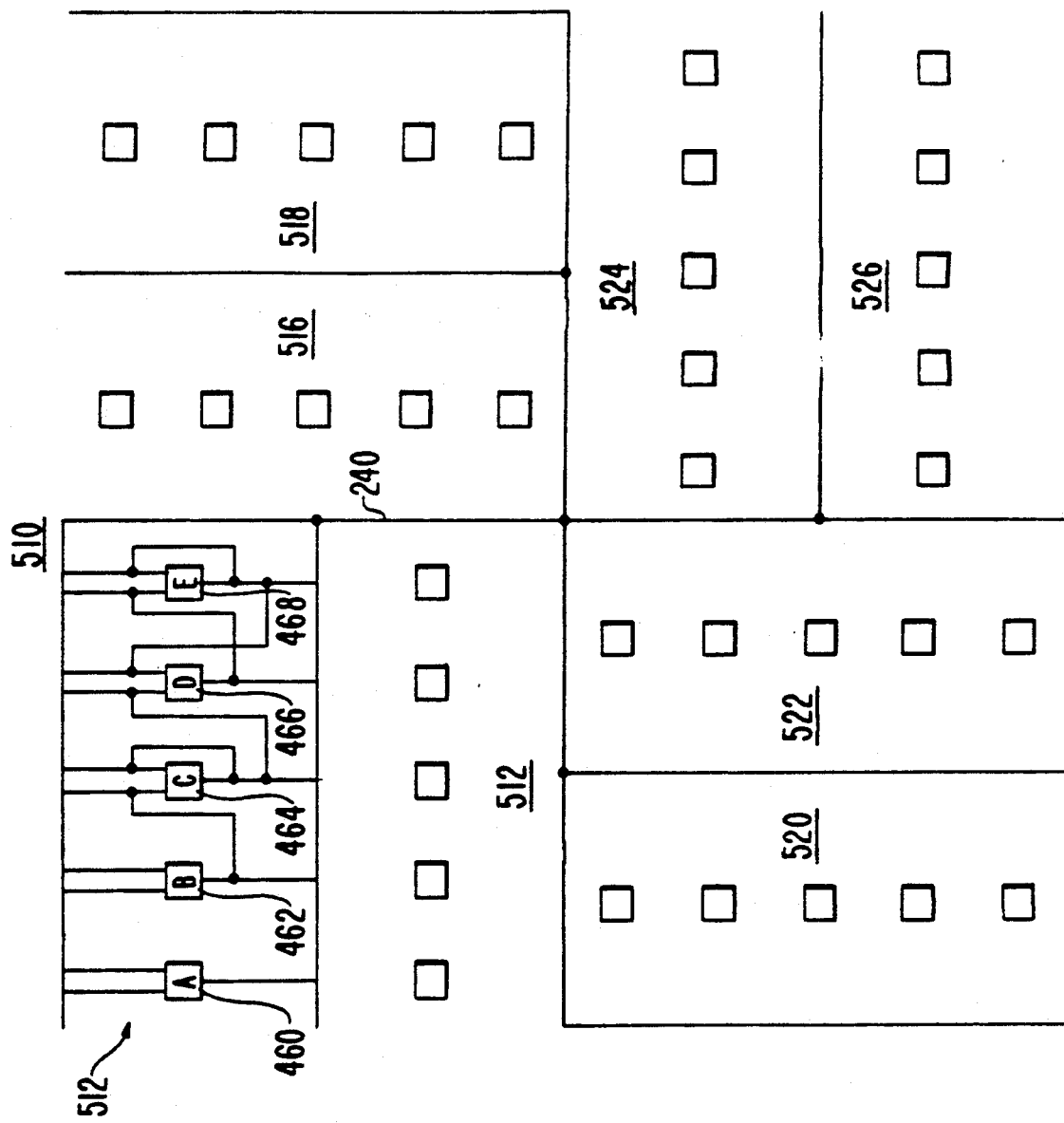
FIG. 22 illustrates an array of eight element building blocks.

When the eight virtual processing element building block 512 as illustrated in FIG. 15 is used to construct a chip 510 including 64 virtual processors and 40 actual processors, an arrangement as illustrated in FIG. 22 can be provided. The size and number of processors on the chip 510 is flexible and current technology could accommodate at least 1000 processors on a single chip allowing an expert system with 10,000 rules to be executed very rapidly.

When multiple processing elements are implemented on a chip using the circuit arrangement illustrated in FIG. 18 a method or device for routing input data to the appropriate element and output data to the appropriate destination must be provided as illustrated in FIG. 23. FIG. 23 illustrates routing and control where the chip includes five physical processing elements and eight virtual processors as illustrated in FIG. 15. In this embodiment the output of second processing element B, as illustrated in FIGS. 15 and 22 is not connected to the bus and only connected to the input of the C element. To provide this optional connection of the output of the B element to the bus would only require a change in the demultiplex ratio of multiplexers 556 and 558. In FIG. 23, the dashed line surrounds the processor 258/488 previously described with respect to FIGS. 8 and 18 and the operation of this portion of the circuit will not be described again. The dotted line surrounds the multiplex circuitry that is necessary only in dual processors C, D and E of FIG. 15 and the single processors A and B do not need this circuitry. The circuits of FIG. 23 have two modes a load mode and a run mode. During the load mode constants are loaded into the constant register 490 and tags (addresses for constants) are loaded into the element tag register 540. Probability inputs can be input during either the load mode which is decoded from the address bus 542 or the run mode which is decoded from the upper data bus 544. During loading an address comparator 546 compares the high order bits of the address on the bus 240 with the address supplied by an address register 548. Although this address could be a permanently stored address, in this eight processor array embodiment, this address is preferably supplied by I/O pins of the chip. When a match occurs, essentially a chip select, the circuit 546 indicates the processor group has been selected. The lower order bits of the address are transferred to a decoder load pulse generator 550. The decoder determines which of the processors A-E is being addressed and outputs load pulses to the appropriate devices. For example, if the constant $A_j$ is being loaded the decoder 550 would produce a load pulse for the appropriate register among the registers 490. Although no particular loading order is required it is preferred that constants and tags be followed by probabilities. The probabilities can only be loaded when the timing control unit 496 indicates that the processing element is not in use, that, is when the in-use-enable line 552 is inactive. When all the constants, run mode tags and probabilities have been loaded into the respective storage locations 260, 490 and 540, the latches 260 indicate to timing and control 496 that all data has been loaded which allows the start of the sequence previously described with respect to FIG. 11 when the run mode is entered. At the end of a calculation, timing control latches the output into output latch 553 and indicates to a conventional arbitration control circuit 554 that the output (A, BC, DE and BCDE) is ready. Timing control 496 can also indicate internally that the output needs to be transferred back to the latches 260 through the multiplexers 492 and 494. When the arbitration circuit 554 gets operation control, the demultiplexer 556 is used to select the output latch 553. The demultiplexer 556 can also select output latches for the other three processors that output to the bus 240 and the demultiplexer 558 is used to select the element address stored in the element address register 560 and to select the buffer 562 which contains the address of the processor group or array. That is, the upper portion of the data bus contains the array address and element within the array producing the output and the lower portion of the bus contains the processing element output probability. At this time a run indicator is driven and another array can then decode the address and determine if this is a probability output needed by an element in the other array. That is in the run mode, by comparing the upper data bus bits with the tag of a needed input stored in the tag register 540 using the run mode address compare circuit 564 a desired input is identified. This circuit 564 will output an appropriate load signal to the latches 260 thereby loading the needed output. Once again when all outputs are loaded the processor 258/488 performs another calculation cycle. If multiple eight virtual processing blocks are produced on a chip such as illustrated in FIG. 22, the address of each processor can be preassigned a hard-wired address, the upper bits of which would select a group of virtual processors and the lower bits would select a processor within the group. By using such hard-wired addresses the virtual processor building blocks can be replicated for as many times as are necessary to implement the desired system within the physical constraints of integrated circuit fabrication techniques.

In applying the chip 510 to a solving a problem, the first step is to create a binary tree of the expert logic similar to that illustrated in FIG. 5. The tree can then be divided into binary subtrees where each subtree includes eight gates or probabilistic logic operations if an eight gate virtual block is used on the chip. The size of the subtrees is chosen to correspond to the size of the virtual building block. Each of the subtrees is then assigned a virtual basic building block for executing the tree. The building block assignment will allow the actual processors which will perform the functions to be identified and the address of the identified processor is then used to route the constants and input probabilities. Because each processor waits until all inputs are available and then automatically starts executing, the chip will execute the tree in the proper order and some processors will even begin execution while others are being loaded. By using a sequence of loading that is depthwise ordered with respect to the binary tree, the chip will very efficiently process the tree.

Figure 24:
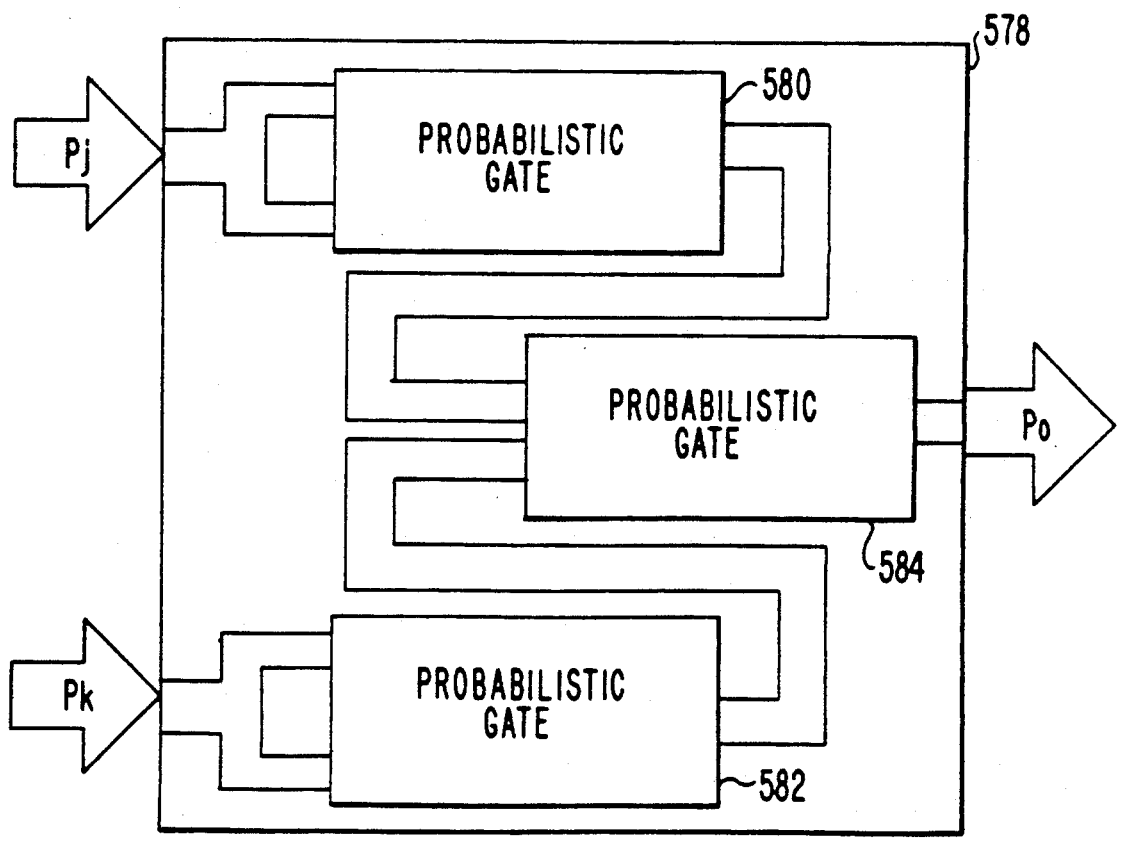
FIG. 24 shows a quadratic resolution gate.

The approach to solving decision processing problems discussed so far herein is based upon mathematical expressions for performing conjunctions under the conditions that the "independence factors" are constant. Some decision processing problems may be sufficiently difficult to formulate that constant independence factors cannot be specified. In these cases, the independence factors are functions of the input signals and power series expansions involving these inputs may be required to improve the reasoning process. Since the probabilistic gate is a mechanism for multiplying two linear expressions together, if a gate is supplied with a common input signal, then the output signal becomes a quadratic expression in terms of the input signal. Therefore, a power series expansion can be made by connecting several gates serially together. By feeding the results of two power series expansion streams to a final probabilistic gate a high-ordered solution to the AND function can be produced. FIG. 24 illustrates the method of connecting gates 580-582, for example the gates of FIG. 8 or 18, together to perform an AND using quadratic expressions.

Figure 25:
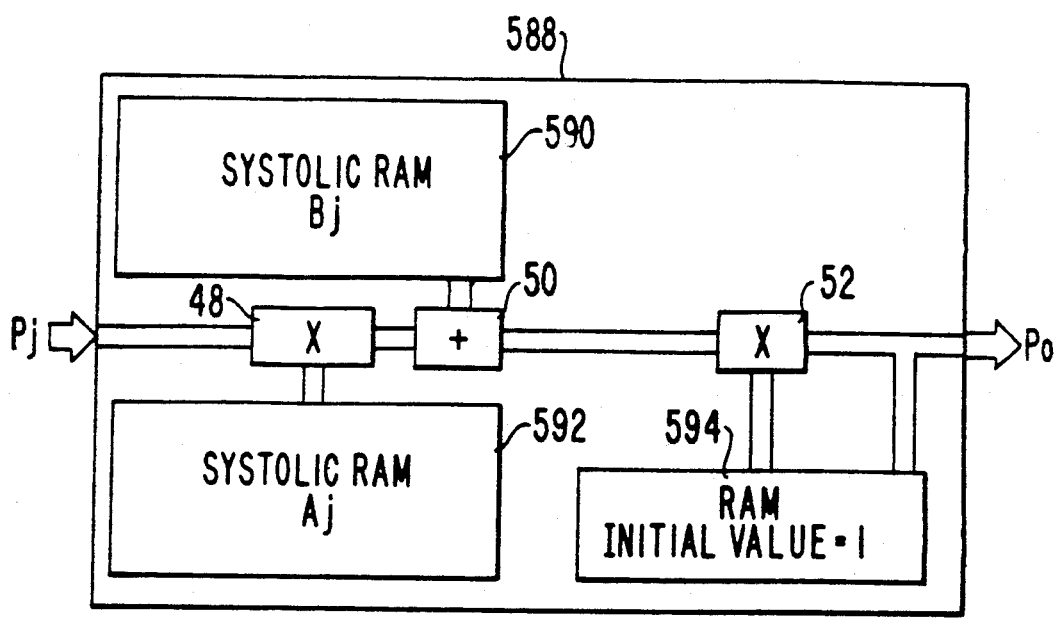
FIG. 25 illustrates a systolic gate 588.

A further embodiment of the present invention can use systolic RAMs 590-594 as illustrated in FIG. 25. This version of an implies element gate 588 of FIG. 25 is a serial processing version which is practical if the input bus feeding the Pjs has bandwidth limitations about an order of magnitude below the probabilistic gate. This approach is generally valid when dealing with signals coming via a bus from a central processing unit. The version of a multi-input AND gate 588 of FIG. 25 is also suitable for building a programmable probabilistic gate array. This type of gate array can handle very large problems and makes good use of the resources on the chip. By combining two of these elements 588 a systolic multi-input probabilistic gate can be produced. By storing the output probabilities $P_0$ in the RAM 594 and using these on later cycles of execution, feedback of prior probabilities to later calculations as intermediate calculation multipliers or implications is possible. This is particularly useful in producing neural net nodes. In addition to providing a programmable probabilistic gate array element, the processor of FIG. 25 can be used to produce the product of probabilities, that is $$P_o = \prod_{j=i}^{n} [A_j P_j + B_j]$$

a very useful capability in probabilistic decision analysis. In this version the RAM 594 holds only a single probability $P_o$. If a RAM 594 were substituted that would hold n probabilities as intermediate implications such that $P_i = A_j \cdot P_j + B_j$ where j and i are equal then a pipeline implication and inference element would be produced when new probabilities are input in which on the next cycle of inputs:

$$P_o = P_i [A_j P_j + B_j] \text{ or}$$

$$P_o = [A_{j-1} P_{j-1} + B_{j-1}] \cdot [A_j P_j + B_j].$$

Such a pipeline or array processing element will speed inference processing when the input signals are serial.

Figure 26:
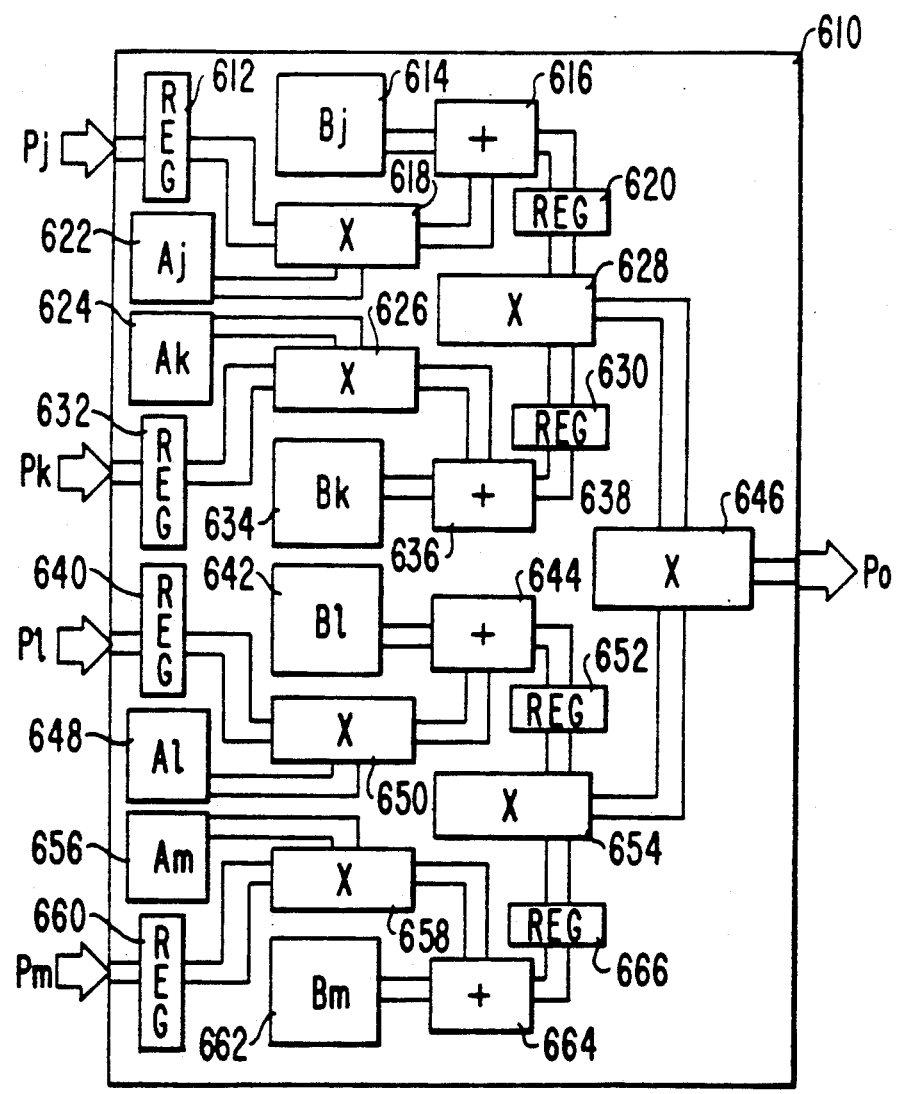
FIG. 26 depicts a four input gate 610.

When directly coupled to sensors via a high bandwidth bus, the serial processing gate bandwidth of FIG. 25 may be too small and a parallel processing version of the gate 610 may be necessary as illustrated in FIG. 26. The parallel processing versions of the multi-input gate 610 are not suitable for building general purpose gate arrays but are useful in building high-speed, hardwired sensor processing systems.

Figure 27:
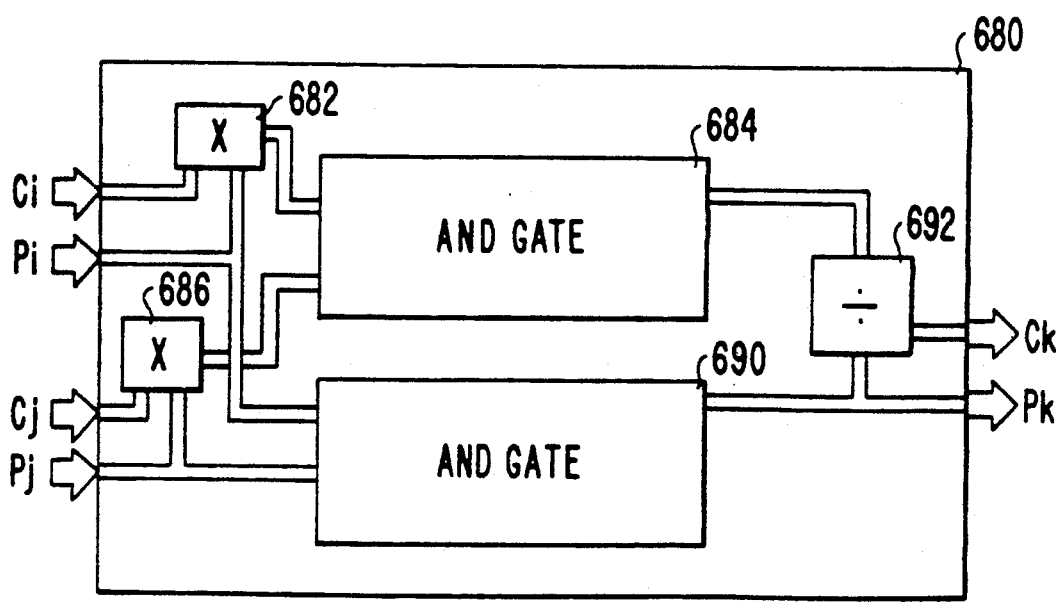
FIG. 27 depicts a weighted decision gate 680.

Another embodiment that could be useful for sensor fusion is the weighted decision gate 680 illustrated in FIG. 27 which would use versions of the universal gate described previously. The circuit 680 is useful for combining two input parameters Ci and Cj with associated probabilities Pi and Pj by using multipliers 682 and 686, AND gates 684 and 686 and a divider 692 to form an output parameter Ck with an associated probability Pk. The parameters Ci and Cj could be sensor readings from two entirely different types of sensors and the output parameter Ck would be a weighted estimate based upon the two input parameters. Another use of this circuit is in terms of risk-decision analysis. In risk-decision analysis, the parameters Ci, Cj, and Ck can be economic measures of risk or success. This weighted decision gate 680 can be built into an array much like the probabilistic gate array described earlier to form either a sophisticated sensor-fusion system or a risk-decision analysis system. The extension of this concept for more than one input parameter is obvious and could be useful for in-depth economic analysis including risk-aversion factors and other utility functions frequently invoked to improve the precision of the decision-making models.

As illustrated in FIGS. 15-17 with respect to element C and with respect to the details of the processing elements in FIGS. 8 and 18 and with respect to the software embodiment of FIG. 6, the present invention provides a processor with feedback capability. This is particularly useful when the processor is being used as a node in a neural network. This capability can be enhanced by providing a RAM for storage of feedback probabilities similar to the RAM 594 illustrated in FIG. 25 except feeding the probabilities back as inputs rather than intermediate multipliers as can occur in FIG. 25.

The present invention is preferably implemented using integer arithmetic, however, at the sacrifice of some speed floating point components could be used.

The many features and advantages of the invention are apparent from the detailed specification and, thus, it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What we claim is:

1. A processing element producing an inference, comprising:
    first and second input lines receiving first and second input signals;
    a digital universal inference gate connected to said first and second input lines, receiving the first and second input signals, for performing a digital linear transformation and combination of the first and second input signals and producing an output probabilistic inference.

2. An element as recited in claim 1, wherein said gate digitally executes $P_o = A_j P_j + B_j] \cdot [A_k P_k + B_k]$ where $P_o$ is an output probability of $P_j$ and $P_k$ are input probability signals and $A_j$, $B_j$, $A_k$ and $B_k$ are transformation constants.

3. An element as recited in claim 1, wherein said first and second input signals are digital probability input signals and said output inference is a probability.

4. An element as recited in claim 1, wherein said gate digitally combines linear transformations of the input signals as the output inference.

5. An element as recited in claim 1, wherein the output is fed back via a digital bus as one of the input signals.

6. An element as recited in claim 1, wherein said gate digitally executes $P_o = [A_j P_j + B_j] \cdot [A_k P_k + B_k] + C_m$ where $P_o$ is the output probability, $P_j$ and $P_k$ are input probabilities and $A_j$, $B_j$, $A_k$, $B_k$ and $C_m$ are transformation constants.

7. An element as recited in claim 1, wherein said gate comprises:
first digital linear transformation means for performing a first digital linear transformation on the first input signal using first and second constants;
second digital linear transformation means for performing a second digital linear transformation on the second input signal using third and fourth constants; and
combination means for digitally combining the first and second digital linear transformations producing an output probability as the output inference.

8. An element as recited in claim 7,
wherein said first digital linear transformation means comprises:
a first multiplier; and
a first adder connected to said first multiplier;
wherein said second digital linear transformation means comprises:
a second multiplier; and
a second adder connected to said second multiplier; and
wherein said combination means comprises a third multiplier connected to said first and second adders.

9. An element as recited in claim 7,
wherein said first digital linear transformation means comprises:
a first digital multiplier circuit digitally multiplying the first input signal times the first constant producing a first output; and
a first digital adder circuit, connected to said first multiplier circuit, digitally adding the second constant to the first output producing a second output;
wherein said second digital linear transformation means comprises:
a second digital multiplier circuit digitally multiplying the second input signal times the third constant producing a third output; and
a second digital adder circuit, connected to said second multiplier, digitally adding the fourth constant to the third output producing a fourth output; and
wherein said combination means comprises a third digital multiplier circuit, connected to said first and second digital adder circuits, digitally multiplying the second output times the fourth output producing the output probability.

10. An element as recited in claim 1, wherein said gate comprises:
first and second universal digital implication elements each performing a digital linear transformation and producing first and second implication outputs from said first and second input signals, respectively; and
first digital combining means for digitally combining the first and second implication outputs to produce a first output inference.

11. An element as recited in claim 10, wherein said universal gate further receives third and fourth input signals and said gate further comprises:
third and fourth universal digital implication elements producing third and fourth implication outputs from said third and fourth input signals, respectively;
second digital combining means for digitally combining the third and fourth implication outputs to produce a second output inference; and
third digital combining means for digitally combining the first and second output inferences to produce a third output inference as the output inference.

12. An element as recited in claim 11, wherein said first through fourth universal digital implication elements each perform digital linear transformations on the first through fourth input signals, said first and second combining means digitally multiplies the first and second implications and second and third implications respectively and said third combining means digitally multiplies the first and second inferences.

13. An element as recited in claim 1, wherein said digital universal inference gate comprises:
a latch register storing the first and second input signals; and
a digital computation unit, connected to said latch register, and performing digital linear transformations on the first and second input signals using constants and digitally combining the linear transformations producing a first output probability as the output inference.

14. A processing element producing an inference, comprising:
a universal inference gate receiving first and second input signals and producing an output inference, said universal inference gate comprising:
a latch storing the first and second input signals; and
a computation unit, connected to said latch, and performing linear transformations on the first and second input signals using constants and combining the linear transformations producing a first output probability, said computation unit comprising a multiplier/adder and said element further comprises:
storage means for storing the constants;
a timing control circuit connected to said multiplier/adder and said storage means, and producing selection and timing signals; and
a first multiplexer, connected to said storage means, said timing control circuit, said latch and said multiplier/adder for selecting one of the input signals and constants.

15. An element as recited in claim 14, further comprising:
a second multiplexer, connected to receive the first and second input signals and third and fourth input signals, and connected to said latch.

16. A processing element producing an implication, comprising:
an input line receiving an input signal; and
a digital universal implication gate connected to said input line, receiving the input signal, for performing a digital linear transformation on the input signal and producing a probabilistic implication output.

17. An element as recited in claim 16, wherein said gate digitally executes $$P_o = A_j P_j + B_j$$

to produce the implication output $P_o$, where $A_j$ and $B_j$ are transformation constants and $P_j$ is the input signal.

18. An element as recited in claim 16, wherein said gate digitally executes $$P_o = \prod_{i=1}^{n} [A_i P_i + B_i]$$

to produce the implication output $P_o$ where $A_j$ and $B_j$ are transformation constants and $P_j$ is input signals.

19. An element as recited in claim 16, wherein the implication output is fed back as an intermediate implication.

20. An element as recited in claim 16, wherein said gate digitally executes:

$$P_o = [A_{i-1} P_{i-1} + B_{31\ 1}] \cdot [A_i P_i + B_i]$$

to produce a probabilistic inference $P_o$ where $A_i$, $B_i$, $A_{i-1}$ and $B_{i-1}$ are transformation constants and $P_i$ is a current input and $P_{i-1}$ is a previous input.

21. A method of performing an inference operation, comprising the steps of:
 (a) performing a first digital linear transformation on a first input signal using a digital computer;
 (b) performing a second digital linear transformation on a second input signal using a digital computer; and
 (c) combining the first and second linear transformations using a digital computer to produce a probabilistic inference.

22. A method as recited in claim 21, wherein step (c) comprises digitally multiplying the first linear transformation by the second linear transformation.

23. A method as recited in claim 21, wherein said first and second input signals and said inference are probabilities.

24. A method of performing an implication operation, comprising:

(a) performing a digital linear transformation on an input signal using a digital computer to produce a probabilistic implication.

25. A method as recited in claim 24, wherein step (a) digitally performs $P_o = A_j P_j + B_j$ to produce a probability implication $P_o$ where $A_j$ and $B_j$ are transformation constants and $P_j$ is a probability input signal.

26. A weighted decision gate receiving first through fourth input signals, said gate comprising:
 a first digital multiplier circuit digitally multiplying the first and second input signals;
 a second digital multiplier circuit digitally multiplying the third and fourth input signals;
 a first digital universal gate receiving the output of the first digital multiplier circuit and the second input signal, and for digitally producing a probabilistic inference of a parameter;
 a second universal gate receiving the output of the second digital multiplier circuit and the fourth input signal, performing a linear transformation and producing a digital parameter probability; and
 a digital divider circuit digitally dividing the probabilistic inference by the probability to produce the parameter.

27. A system, comprising:
 a first digital probabilistic gate receiving first and second input signals, for performing a digital linear transformation on and combination of said first and second input signals and producing a first probabilistic inference;
 a second digital probabilistic gate receiving third and fourth input signals, for performing a digital linear transformation and combination of said third and fourth input signals and producing a second probabilistic inference; and
 a third probabilistic gate connected to said first and second probabilistic gates, for performing a digital linear transformation and combination of the first and second inferences and producing a third probabilistic inference.

28. A system as recited in claim 27, wherein said first, second and third inferences and said first and second input signals are digital probabilities.

* * * * *